US010552410B2

(12) United States Patent
Milligan et al.

(10) Patent No.: US 10,552,410 B2
(45) Date of Patent: Feb. 4, 2020

(54) METHOD AND SYSTEM FOR PRESENTING A USER SELECTABLE INTERFACE IN RESPONSE TO A NATURAL LANGUAGE REQUEST

(71) Applicant: MINDBRIDGE ANALYTICS INC., Ottawa (CA)

(72) Inventors: Nicolas Yvon Elijah Milligan, Ottawa (CA); Robin Neil Grosset, Ottawa (CA)

(73) Assignee: MINDBRIDGE ANALYTICS INC., Ottawa (CA)

( * ) Notice: Subject to any disclaimer, the term of this patent is extended or adjusted under 35 U.S.C. 154(b) by 235 days.

(21) Appl. No.: 15/812,710

(22) Filed: Nov. 14, 2017

(65) Prior Publication Data

US 2019/0147083 A1     May 16, 2019

(51) Int. Cl.
*G06F 7/00* (2006.01)
*G06F 16/242* (2019.01)
*G06F 16/248* (2019.01)
*G06F 16/33* (2019.01)

(52) U.S. Cl.
CPC ........ *G06F 16/2428* (2019.01); *G06F 16/248* (2019.01); *G06F 16/3344* (2019.01)

(58) Field of Classification Search
CPC .................................................. G06F 16/3344
See application file for complete search history.

(56) References Cited

U.S. PATENT DOCUMENTS

| 5,748,974 | A | 5/1998 | Johnson |
| 6,567,797 | B1 | 5/2003 | Schuetze et al. |
| 6,584,470 | B2 | 6/2003 | Veale |
| 6,766,320 | B1 | 7/2004 | Wang et al. |
| 7,624,007 | B2 | 11/2009 | Bennett |
| 7,873,654 | B2 | 1/2011 | Bernard |
| 9,570,070 | B2 | 2/2017 | Baldwin et al. |
| 9,583,104 | B2 | 2/2017 | Landry et al. |
| 9,620,113 | B2 | 4/2017 | Kennewick et al. |
| 9,633,317 | B2 * | 4/2017 | Gabel ..................... G06N 5/022 |
| 9,798,719 | B2 * | 10/2017 | Karov ................. G06F 17/2785 |

(Continued)

FOREIGN PATENT DOCUMENTS

WO   WO-2019/095033 A1   5/2019

*Primary Examiner* — Ajith Jacob
(74) *Attorney, Agent, or Firm* — Sean Murray; Murray IP Consulting Inc.

(57) ABSTRACT

The present invention discloses numerous implementations of system and method which receives a user request and, using methods of natural language processing including part of speech tagging, analyses the user request to generate a query to a database of information. Based on the machine understanding, the system presents an interactive representation of the uttered request back to the user. This provides context to the user, which explains the machine understanding of the request and acts as an interface to iteratively refine or adjust the machine understanding by altering specific elements of the uttered language. The methods of altering specific elements of the uttered language may vary depending on the element and a variety of user selectable interfaces may be used to display one or more queried elements along with alternative elements pertaining to the queried element. The user could select an alternative element and change the database query.

20 Claims, 19 Drawing Sheets

(56) References Cited

U.S. PATENT DOCUMENTS

| | | |
|---|---|---|
| 2002/0152202 A1 | 10/2002 | Perro et al. |
| 2003/0014398 A1 | 1/2003 | Ohta et al. |
| 2008/0104032 A1 | 5/2008 | Sarkar |
| 2009/0287680 A1 | 11/2009 | Paek et al. |
| 2011/0320187 A1 | 12/2011 | Motik et al. |

* cited by examiner

METHOD AND SYSTEM FOR PRESENTING A USER SELECTABLE INTERFACE IN RESPONSE TO A NATURAL LANGUAGE REQUEST

FIELD OF THE INVENTION

The invention relates generally to natural language requests and, more particularly, to method and system for presenting a user selectable interface in response to a natural language request.

BACKGROUND OF THE INVENTION

Natural Language Processing (NLP) is a field of Artificial Intelligence (AI) in which computer systems parse, understand and communicate with human-like language. Humans communicate with language and it is highly beneficial for computing systems to be able to communicate and understand language in this way as it permits more fluid interaction between a machine and an operator.

A predominant way in which people find information and interact with computing systems is to use search engines where they type their query in some form to receive a response. These started as simple keyword searches. In database systems, when searching for data, knowledge of a query syntax or language like SQL is sometimes required. Over time, searching has become more sophisticated and, with the introduction of NLP, users in some systems can simply ask a question and hopefully the AI behind the system will produce an appropriate answer.

Unfortunately, directly translating these NLP statements into some form of a query language, like SQL, has been known to have poor performance and accuracy. This is due to the intricacy of understanding complex search semantics combined with the ambiguity of language with the additional complexity of machine translation.

User interfaces are primarily used as a method of navigation and filtering a set of data or information to analyze. Methods of filtering using user selectable interfaces can for example exclude certain portions of the data which does not meet certain criteria. These filters can be a single discrete filter or a combination of filters which could enable the user to find better insights of their data. User interfaces can also be described as a form of a single or multiple manipulatable data visualizations.

Against this background, there is a need for solutions that will mitigate at least one of the above problems, particularly an improved system for processing natural language requests.

SUMMARY OF THE INVENTION

Provided are a method, computer program product, and system for using uttered or written language to present, interact and iteratively refine a user request. The system comprises language processing components to identify interesting lexical elements in the original request combined with a means to determine alternate elements both language constructs and possible alternative database elements. The original request is expressed back to the user in an interface with selectable elements permitting iterative refinement of the request as a means to correct the machine understanding of the original request and also to navigate and explore the context of the request.

According to a first broad aspect, the present invention is a method comprising: receiving a natural language request for a database query from a user; identifying a plurality of words in the natural language request including at least one queried element, the queried element associated with an intent by the user for the database query; determining at least one alternative element for the queried element, the alternative element associated with a possible alternative intent for the database query not included in the natural language request; and presenting a visual representation of the natural language request to the user, the visual representation comprising a set of the words identified in the natural language request and a user selectable interface enabling the user to select the queried element or the alternative element to include in the database query.

In some embodiments, the method may further comprise: causing a first database query to a database using elements from the natural language request including the queried element; receiving results from the database in response to the first database query; and presenting the results of the first database query to the user. The presenting the results of the first database query may be concurrent with presenting the visual representation of the natural language request including the user selectable interface to the user. In further embodiments, the method may comprise: receiving a selection of the alternative element from the user selectable interface; causing a second database query to the database using elements from the natural language query with the selected alternative element instead of the queried element; receiving results from the database in response to the second database query; and presenting the results of the second database query to the user. The method may further comprise presenting the visual representation of the natural language query with the selected alternative element replacing the queried element.

In some embodiments, the user selectable interface may comprise a selectable element within the visual representation of the natural language query. In this case, if the user selects the selectable element, the method may comprise presenting a menu with the queried element and the alternative element selectable by the user. In some implementations, the selectable element is a visual representation of the queried element. In some embodiments, the determining at least one alternative element for the queried element comprises determining a plurality of alternative elements for the queried element. Each of the plurality of alternative elements may be associated with a different possible alternative intent for the database query not included in the natural language request.

In some embodiments, the database may comprise a plurality of records, each record comprising an entry for each of a plurality of attributes of the records. In this case, the queried element may comprise one of the attributes of the records as a queried attribute and the alternative element may comprise another one of the attributes of the records as an alternative attribute. The results from the first database query may comprise a subset of the plurality of records at least partially determined based upon the queried attribute and the second database query may comprise a subset of the plurality of records at least partially determined based upon the alternative attribute. In some embodiments, the database may comprise a plurality of records sortable by a plurality of metadata components, each of the records comprising a value for each of the metadata components. In this case, the queried element may comprise one of the metadata components and the alternative element may comprise another one of the metadata components. The results from the first database query may comprise a subset of the plurality of records determined based upon the metadata component of the queried element and the results from the second database query may comprise a subset of the plurality of records determined based upon the metadata component of the alternative element.

In some embodiments, the method may further comprise identifying a subject in the natural language query associated with the queried element. In this case, the queried element may be a relative term associated with the subject and the queried element may relate to a first context of the subject and the alternative element may relate to a second context of the subject. The first context of the subject may comprise one of an increase in value and a decrease in value of the subject and the second context of the subject may comprise the other one of the increase in value and the decrease in value of the subject.

In some embodiments, the method may further comprise: identifying a queried relative term associated with the queried element in the natural language query, the queried relative term relating to a first context of the queried element; and determining at least one alternative relative term to the queried relative term, the alternative relative term relating to a second context of the queried element. In this case, the user selectable interface may comprise a first user selectable interface and the visual representation of the natural language query may comprise a second user selectable interface enabling the user to select the queried relative term or the alternative relative term to include in the natural language query. The first context of the queried element may comprise one of an increase in value and a decrease in value of the queried element and the second context of the queried element may comprise the other one of the increase in value and the decrease in value of the queried element.

In some embodiments, the step of identifying at least one queried element may comprise identifying first and second queried elements in the natural language query and the step of determining at least one alternative element to the queried element may comprise determining at least one first alternative element to the first queried element and determining at least one second alternative element to the second queried element, the first alternative element being categorized with the first queried element and the second alternative element being categorized with the second queried element. In this case, the user selectable interface may comprise a first user selectable interface enabling the user to select one of the first queried element and the first alternative element to include in the natural language query. Further, the visual representation of the natural language query may comprise a second user selectable interface enabling the user to select one of the second queried element and the second alternative element to include in the natural language query.

In some embodiments, the step of receiving a natural language query from a user may comprise receiving a verbal query from the user and the method may further comprise interpreting the verbal query to determine a textual representation of the verbal query. In this case, the step of identifying at least one queried element in the natural language query may comprise identifying at least one queried element in the textual representation of the verbal query. In other embodiments, the step of receiving a natural language query from a user may comprise receiving a textual query from the user. In this case, the step of identifying at least one queried element in the natural language query may comprise identifying at least one queried element in the textual query.

According to a second broad aspect, the present invention is a computing system operable to be coupled to a user input device and a visual display. The computing system comprises a database interface and a processing apparatus coupled to the database interface. The processing apparatus is operable to receive a natural language request for a database query from a user via the user input device; to identify a plurality of words in the natural language request including at least one queried element, the queried element associated with an intent by the user for the database query; to determine at least one alternative element for the queried element, the alternative element associated with a possible alternative intent for the database query not included in the natural language request; and to present a visual representation of the natural language request on the visual display, the visual representation comprising a set of the words identified in the natural language request and a user selectable interface enabling the user to select the queried element or the alternative element to include in the database query. In some embodiments, the processing apparatus is further operable to cause a first database query to a database via the database interface using elements from the natural language request including the queried element; to receive results from the database via the database interface in response to the first database query; and to present the results of the first database query on the visual display concurrently with presenting the visual representation of the natural language request including the user selectable interface on the visual display. In some embodiments, the processing apparatus is further operable to receive a selection of the alternative element from the user selectable interface; to cause a second database query to the database via the database interface using elements from the natural language query with the selected alternative element instead of the queried element; to receive results from the database via the network interface in response to the second database query; to present the results of the second database query on the visual display; and to present the visual representation of the natural language query with the selected alternative element replacing the queried element on the visual display.

According to a third broad aspect, the present invention is non-transitory computer-readable media containing a program element executable by a computing system to perform a method for presenting a visual representation of a natural language query. The computer-readable media comprises: first program code for receiving a natural language request for a database query from a user; second program code for identifying a plurality of words in the natural language request including at least one queried element, the queried element associated with an intent by the user for the database query; third program code for determining at least one alternative element for the queried element, the alternative element associated with a possible alternative intent for the database query not included in the natural language request; and fourth program code for presenting a visual representation of the natural language request to the user, the visual representation comprising a set of the words identified in the natural language request and a user selectable interface enabling the user to select the queried element or the alternative element to include in the database query.

These and other aspects of the invention will become apparent to those of ordinary skill in the art upon review of the following description of certain embodiments of the invention in conjunction with the accompanying drawings.

BRIEF DESCRIPTION OF THE DRAWINGS

A detailed description of embodiments of the invention is provided herein below, by way of example only, with reference to the accompanying drawings, in which.

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

Embodiments of the present invention relate to the interaction between natural language searching and the iterative refinement of a database query. If a user searches for an item of data, the user may express their enquiry in a natural human way such as "Find me financial transactions which were submitted just before quarter end?". Given the vagaries and differences in human language, often the human operator can struggle to get the correct meaning for their enquiry in the first attempt. Oftentimes, the user will restart the query process, ask their question in a different accent, for example, to try to get the machine to understand them.

In this circumstance, it can be frustrating for the user and often users give up and find some other means to find the information, perhaps even restating their question in a different way. For this reason, it is useful for the machine that understands the enquiry to read back the understood enquiry to the user in the way the machine understood it, perhaps phrased more precisely but also to allow the user to correct just one element that perhaps the machine misunderstood. Further, if the user is following a train of thought, common in analytics and hypothesis testing, then the user's next enquiry may be derived from or only slightly changed from the original, thus the follow up question could be for example "Okay now show me this for last quarter".

Embodiments of the present invention relate to multi-modal feedback for natural language enquiries which permits the user to ask questions naturally but interactively and iteratively refine their question without using language. This is achieved by interacting with a representation of their original enquiry where one or more option or variable in their phrasing can be altered and are presented in a user interface with selectable element(s).

The user interfaces can differ depending on the enquiry made and the type of user interface assigned to each option of the NLP enquiry. One skilled in the art would understand that the user interfaces are not limited to those described.

Figure 1A:
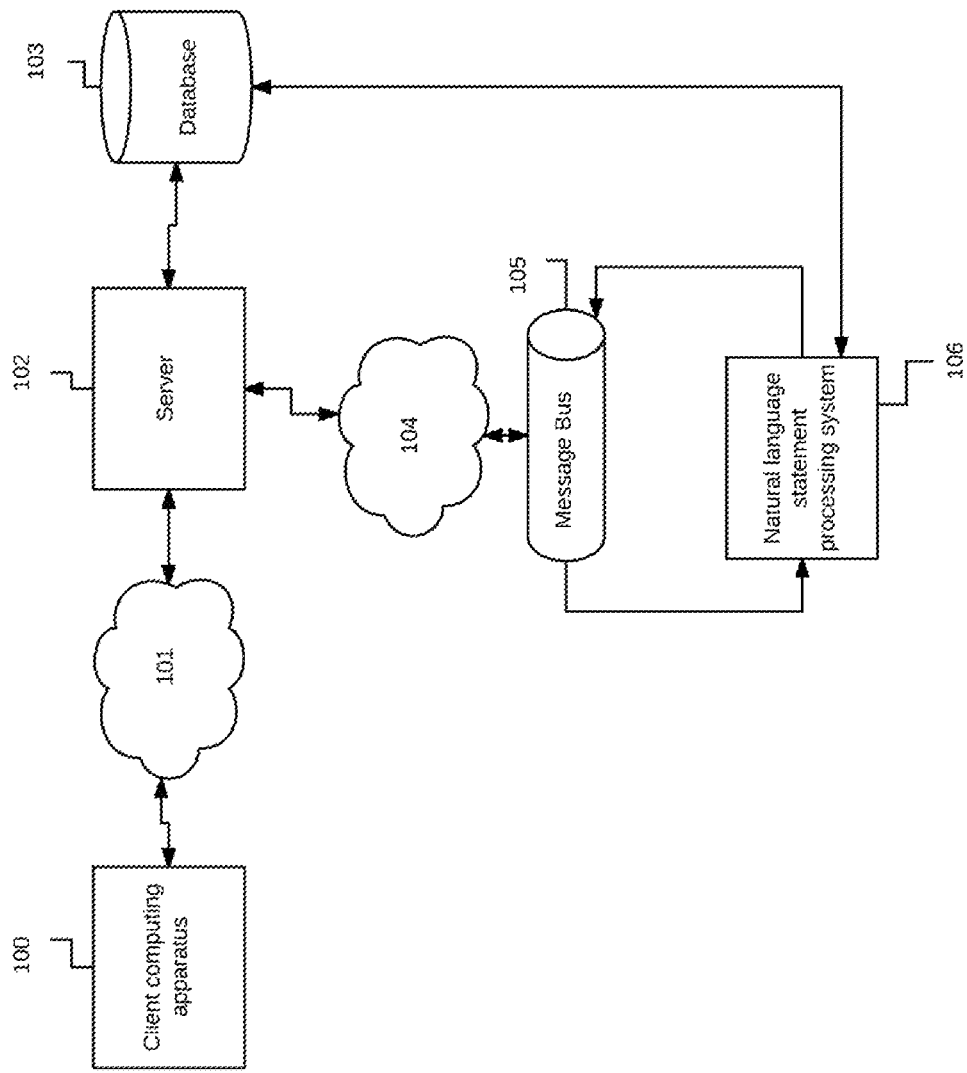
FIG. 1A is an architecture block diagram according to an embodiment of the present invention.

Referring now to the figures, FIG. 1A is an architecture block diagram according to an embodiment of the present invention. As shown in FIG. 1A, a client computing apparatus 100 is coupled to a server 102 via a network 101. The network 101 may be an Internet Protocol IP-based network and the server 102 may be a real or virtual instance of a web based server within a system that performs computation that may be connected to one or more clients. In some embodiments, the server 102 may be a locally based server which serves a similar function. The server 102 is coupled to a database 103 that provides information necessary for advanced natural language processing which is coupled via a network 104, which may also be an Internet Protocol (IP)-based network, to a message bus 105. The message bus 105 is another system which may be implemented within one or more physical servers that can relay information between a plurality of systems of computation. The message bus is further coupled to a Natural Language Statement Processing System 106.

The client computing apparatus 100 may be a portable computer, a desktop computer, a portable tablet, a cell phone or any computer systems that may contain the means of performing computation and is connected or not connected to a network. The client computing apparatus 100 may also include one or more inputs such as a keyboard (not shown), microphone (not shown), neuroimaging capturing apparatus (not shown) and display apparatus (not shown) such as a monitor or virtual reality goggles in which a user may be able to communicate messages. A user of the client computing apparatus 100 may use any possible means of input to a client computing apparatus 100 to enter a search entry. The search entry may be in the form of a natural language question or perhaps a natural language statement. These possible search entries will be referred to as a natural language request.

The client computing apparatus 100 may contain one or more methods to connect to the internet to access a large front-end web interface that may be written in a large variety of programming languages that may display multiple elements of user interfaces to the user of the client computing apparatus 100. The user can use a web interface (not shown) of the client computing apparatus 100 to communicate through one of many web Application Program Interface (API) requests across the IP-based network 101 with the server 102. In this implementation, the server 102 may receive information from the client computing apparatus 100, save information within a database 103 and later possibly return said information using an API request or a similar protocol. One skilled in the art may prefer to alternatively use a Simple Object Access Protocol (SOAP). These API requests are sent to the server 102, which may have multiple request destinations, or end-points with an API façade going through the IP-based network 104 delegating the requests to their appropriate services or appropriate locations in the server application framework. The information being relayed may be data and messages pertaining to the embodiment of the present invention. The message bus 105 may relay a message containing the natural language request entered by the user from the application server 102 to the natural language statement processing system 106 which may encapsulate a large quantity of systems or functions.

The message, arriving from the message bus 105, is received by the natural language statement processing system 106. In some embodiments of the present invention, the system 106 communicates with a database 103, or a similar data collecting agent, which may contain a large variety of previous natural language requests or parts of previous natural language requests that have already been either pre-processed or processed through a possible implementation of a similar system of the embodiment of the present invention. If a match for the natural language request or partial match for the natural language request in the database or multiple databases is found, an object of data containing attributed information on the natural language request, possibly including the natural language request itself, will be relayed through the message bus 105 to then be relayed via network 104 and received by the server 102 to return this data to the client computing apparatus 100 using an API code.

Figure 1B:
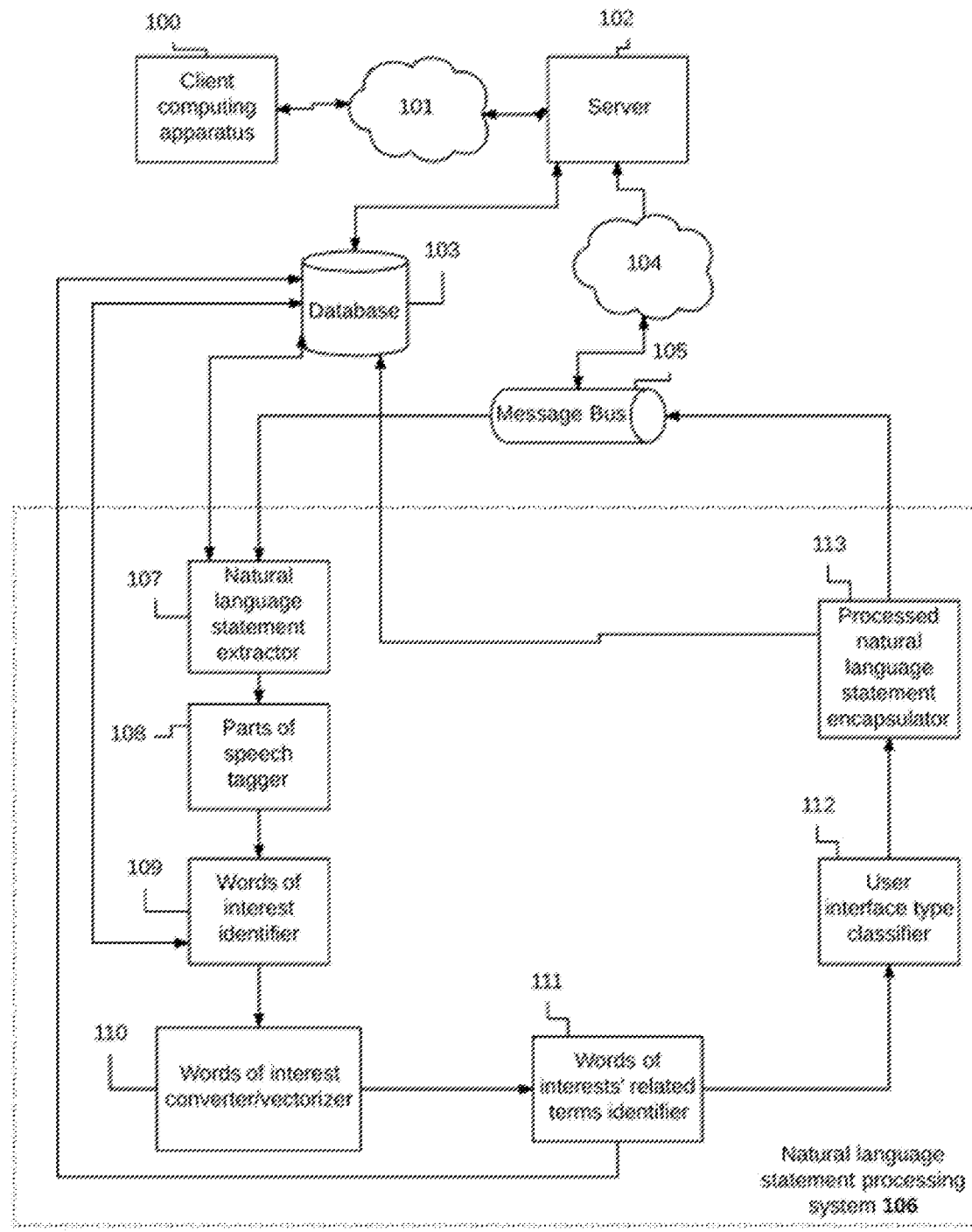
FIG. 1B is an architecture block diagram of a natural language processing system according to an embodiment of the present invention.

FIG. 1B is the architecture block diagram of FIG. 1A with a logical depiction of a natural language processing (NLP) system according to an embodiment of the present invention.

The Natural Language Statement Processing System 106 may begin a process which searches in one or more directories, such as database 103, for an exact match or similar matches to a natural language request input by the user on the client computing apparatus 100. In this embodiment, this component is described as the natural language statement extractor 107. If a match or partial match for the natural language request is not found, then the natural language request will continue to be processed through an implementation of the natural language statement processing system 106.

The natural language request may then undergo a parts of speech tagging process in a Parts of Speech Tagger 108 in which the words of the natural language request will be grammatically tagged and categorized, to remove some if not all ambiguity, based on its definition, context, location in sentence etc. The output of the Parts of Speech Tagger 108 may then continue to a Words of Interest Identifier 109 which may begin by removing insignificant, or stop, words from the natural language request. A stop word is a commonly used word such as "the" in English. Next, the Words of Interest Identifier 109 may identify words of interest relating to multiple domains or specific to a single domain, possibly by iterating over each word and each possibility of each combination of words, in any possible form, to attempt to find matches inside the database 103 or some other possible form of storage or directory.

Once the words of interest within the natural language request have been identified by the Words of Interest Identifier 109, those words may be converted within a Words of Interest Converter/Vectorizer 110 into different formats. This may include attributing each word with a set of properties, encoding each word into a single vector containing a distributed representation of the word, using several hundred dimensions each containing a weight, to contribute to the definition of the word, and stemming each word, which is a method of reducing words to their word stem, base or root form.

Using the results from the Words of Interest Converter/Vectorizer 110, these converted words may be used to identify related properties or related terms using the Words of Interests' Related Terms Identifier 111. An example of an identified related term may be a term that links to a list of terms within a group, such as a country which is included in a list of countries. An additional property or term that would be useful for this identified term may be a type, possibly regarding a specific domain or database collection, like Country or Account. Additional information may also be beneficial to tag the natural language request's words with such as contextually similar or dissimilar words. These may be a list of synonyms or antonyms that relate to a word or sequence of words or a pointer to some form of storage like a database, such as database 103, that includes related words to a specific term. These related words will be referred to as alternative elements and may represent alternative intents for a database query that a user may want to initiate using the alternative element instead of a particular word of interest.

Further, classifying words or sequence of words within the natural language request using a User Interface Type Classifier 112 may also be beneficial to help display the natural language request's words or sequence of words in a suitable representation. Each word or sequence of words will be attributed with a user interface type, possibly depending on the data contained within the words or sequence of words, to be conceivably used to generate user interfaces. A possible example of such a type may be a dropdown menu, possibly containing radio buttons or checkboxes, for words or sequences of words with a set of alternative possible selections of contextually similar words. Other examples of possible selections include a date picker user interface for words or sequence of words that may relate to some form of a date format.

Once the natural language statement processing system 106 has arrived at the last stage, an encapsulation of the natural language request's tagged words or sequence of words into one or more model representations and may be done through a Processed Natural Language Statement Encapsulator 113. A model representation may be defined as a conceptual model or domain model representing one or more concepts. In this embodiment, our model representation will be converted into one or more possible model representations using an object notation such as JavaScript Object Notation (JSON). One skilled in the art may alternatively use a similar object notation such as the Extensible Markup Language (XML). This model representation may then be saved, conceivably using the natural language request as a key and the complete or partial model representation as the value, into storage such as the database 103. Once completed, an identifier of the model representation, such as the natural language request itself, may be sent back to the message bus 105 to be relayed towards the server 102 to query the database 103 for the model representation matching the identifier to finally be returned to the client computing apparatus 100 via a network 101. Once received by the client computing apparatus 100, the client computing apparatus 100 may process the model representation to allow the display element of the client computing apparatus 100 to display the multi-modal feedback for natural language enquiries which will be described in later figures.

Figure 2A:
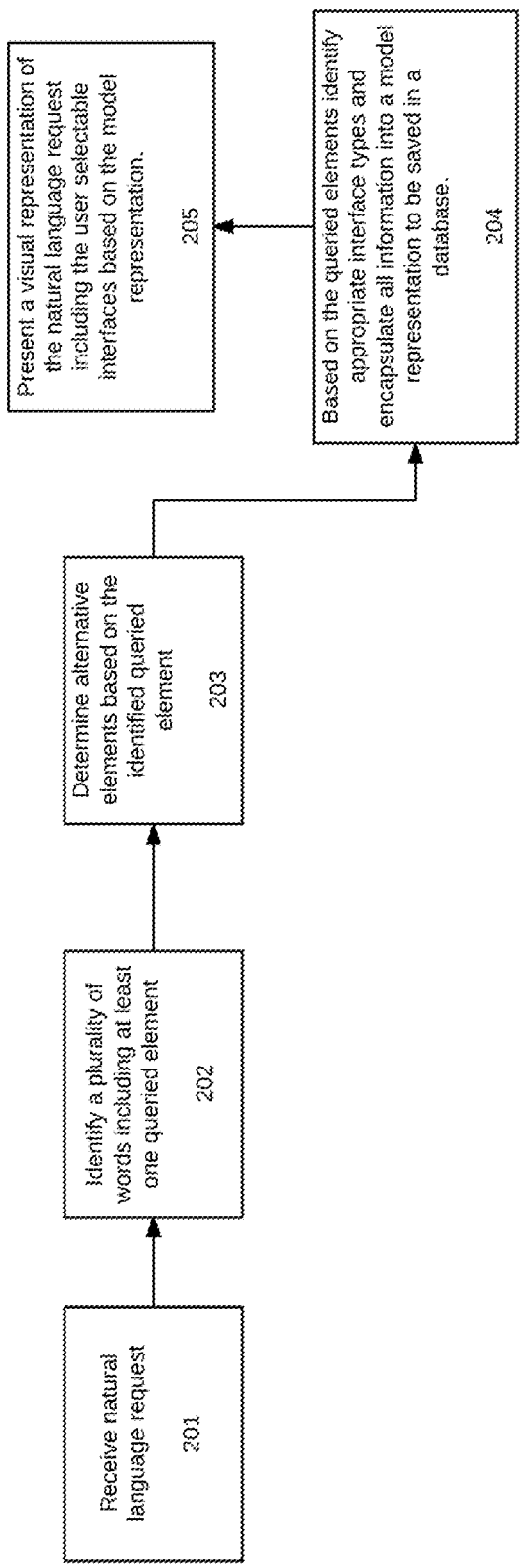
FIG. 2A is a flow chart depicting a series of steps performed by a natural language processing system that may require initiation of a natural language request according to an embodiment of the present invention.

Following the logic described for FIG. 1B, a logical flow process described with reference to FIGS. 2A, 2B and 2C may be implemented by a natural language statement processing system 106. As shown in FIG. 2A, the system 106 may receive a natural language request from a user at step 201 and a plurality of words may be identified in the user's natural language request for at least one queried element at step 202. This queried element could be a word of interest and could be associated with an intent by the user for the database query. In FIG. 1B step 202 could be implemented with elements 107, 108, 109 and 110 of the Natural Language Statement Processing System 106.

Subsequently, the system 106 can determine alternative elements of the queried element at step 203. The alternative element could represent possible alternative intents which were not initially included in the natural language request made by the user but may be used as replacements for the queried element in subsequent database queries. In FIG. 1B, step 203 may be implemented within the Words of Interest Related Terms Identifier 111. Alternatively, step 203 may be implemented at an earlier or later stage of the process.

In step 204, the system 106 may add new properties to the queried elements including a type classifier for the most appropriate user selectable interface and may encapsulate all the words, queried elements, alternative elements in addition to any other property one skilled in the art would find adequate into a model representation of the natural language request. Step 204 could be implemented with elements 112 and 113 in FIG. 1B.

The system 106 then may initiate the process to present of a visual representation of the natural language request and its queried elements on the client computing apparatus 100 at step 205. The system would notify the message bus 105 to continue the process back to the client computing apparatus 100 as detailed in FIGS. 1A and 1B. The queried elements can be displayed as user selectable interfaces which would enable the user to select the queried element and chose a possible alternative element of the currently selected query element which will be described herein below in detail.

Figure 2B:
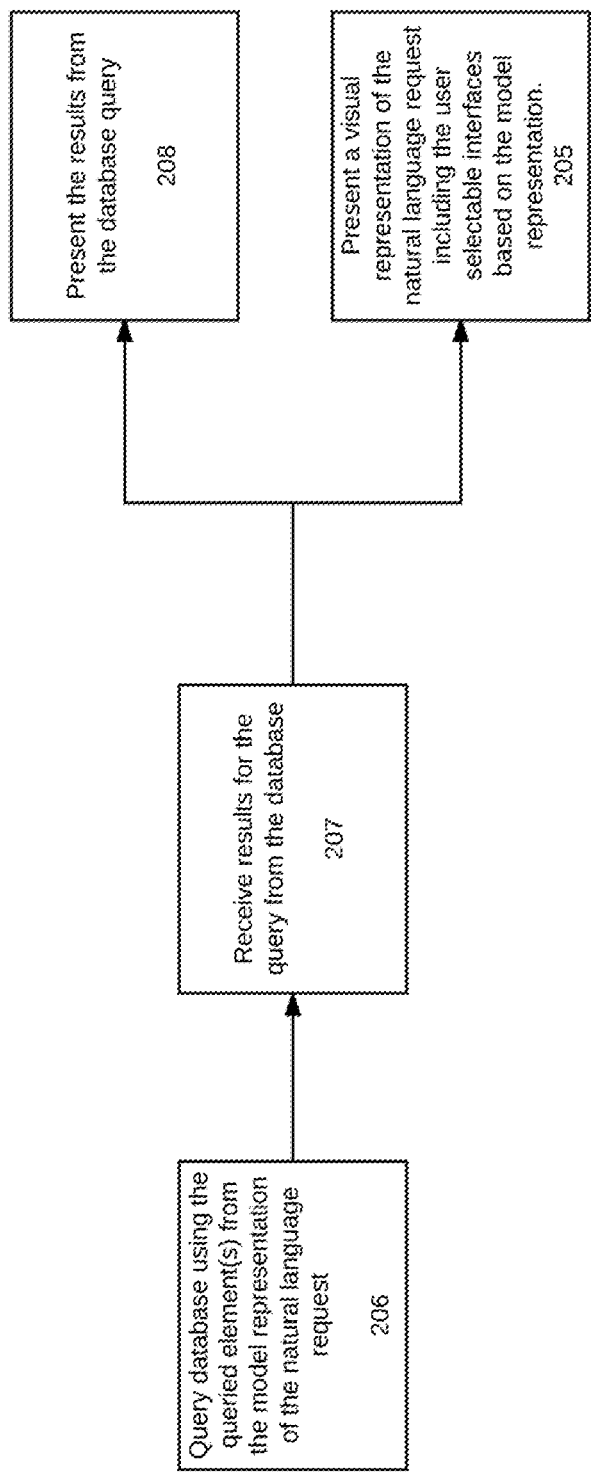
FIGS. 2B and 2C are flow charts depicting a series of steps performed by a client side system using the results from the logic within FIG. 2A according to an embodiment of the present invention.

FIG. 2B depicts another flow process, continuing on the logic described with reference to FIG. 2A, that may be implemented by the Server 102. The process of FIG. 2B begins with a query to a database 103 using queried elements from the model representation of the natural language request created by the system 106 including the queried element at step 206. This database query may be arranged using the elements of the natural language request and possibly the metadata of the elements of the natural language request. Once the database 103 receives the first database query, the database 103 will return the appropriate results to the Server 102 207. With these results, the server 102 can send an IP-based network request 101 containing the results to the client computing apparatus 100, in a form deemed appropriate for the results' format, to be displayed to the user at step 208. The queried elements could be displayed as user selectable interfaces which would enable the user to select each queried element and select a possible alternative element of the currently selected query element. The results should be concurrent with the representation of the visual representation of the natural language request similar to previously described step 205.

Figure 2C:
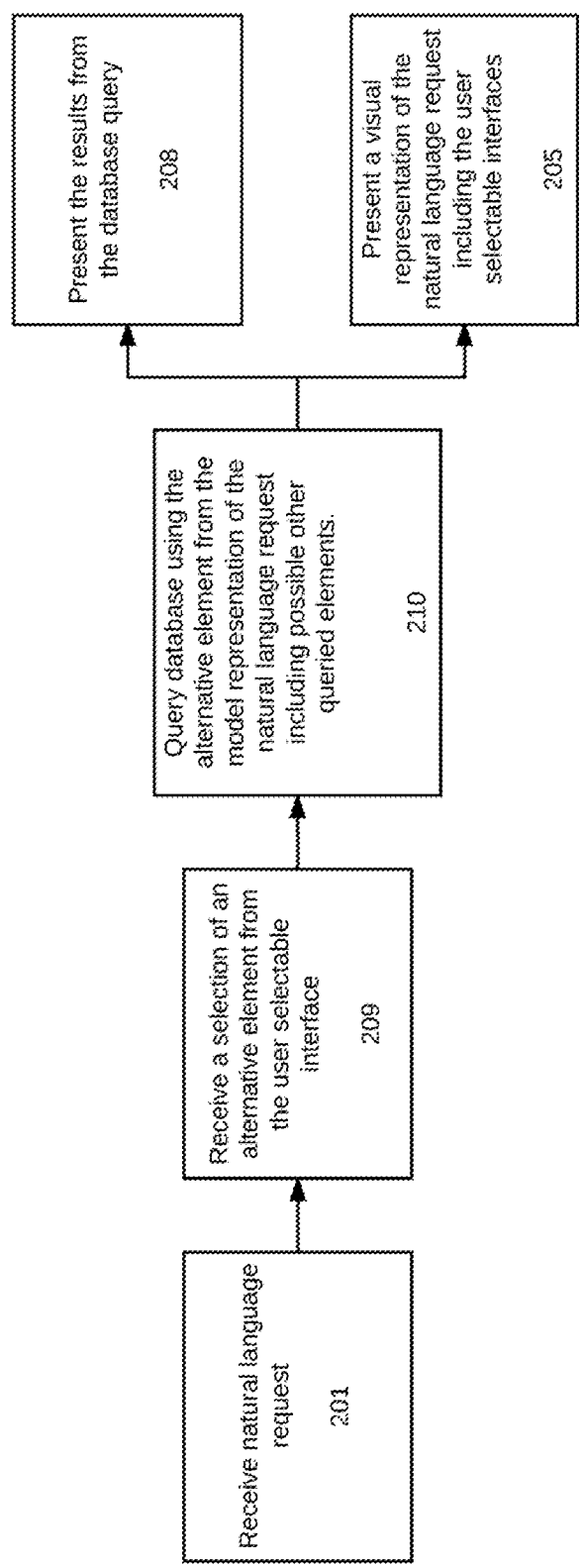

FIG. 2C depicts a further flow process, continuing on the logic described with reference to FIGS. 2A and 2B which may commence when the user makes a selection of an alternative element from any of the user selectable interfaces. Once the user makes a selection of an alternative element, the Server 102 may receive the selection at step 209. Upon receiving such a selection, the Server 102 may initiate a subsequent database query using the alternative element from model representation of the natural language request, created by the system 106, at step 210. Once the database 103 receives this distinct database query, the database 103 will return the appropriate results to the server 102. With these results, the server 102 can initiate a IP-based network request 101 containing the results to be presented on the client computing apparatus 100 in a form deemed appropriate for the results' format, at step 208. Similar to previously described step 205, the system may further initiate presenting a visual representation of the natural language request and its queried elements, which may now contain an alternative element, on the client computing apparatus 100. The queried elements can be displayed as user selectable interfaces which would enable the user to select the queried element and select a possible alternative element of the currently selected query element. As previously described, the results should be concurrent with the representation of the visual representation of the natural language request.

Figure 3A:
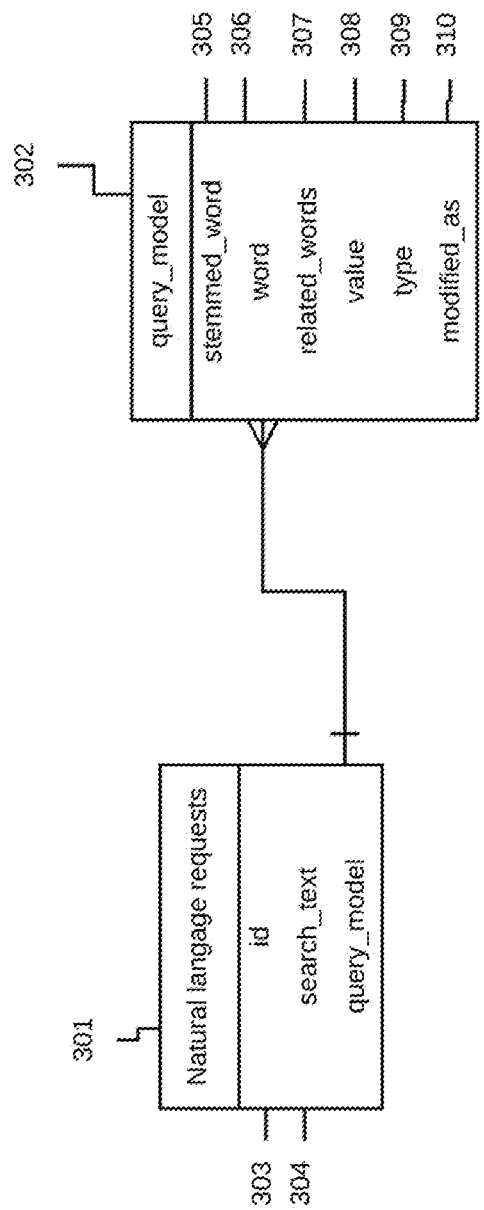
FIGS. 3A and 3B are detailed database model diagrams depicting a possible embodiment of the database containing the natural language requests according to an embodiment of the present invention.

FIG. 3A is a depiction of a database table model possibly stored within the database 103 of FIGS. 1A and 1B according to one embodiment of the present invention. As depicted, the database table model of FIG. 3A comprises of a natural language requests table 301 and a query model table 302. The natural language requests table 301 may encompass a large amount of entries pertaining to all current, past and future natural language requests that a user or multiple users may enter. This collection may store as properties a unique identifier as "id"303 and the natural language request as "search_text" 304.

The query model table 302 may have one or more relationships with the natural language requests table 301 which means that, for every natural language request, there may be multiple query models. Each of these query models may relate to a single or multiple words within an natural language request and all properties or metadata that may be appropriate for said given word(s) in the natural language request. A query model may contain one or more of a stemmed word 305, the word itself 306, all alternative elements in the form of a "related-words" array 307, a value specific to said word 308, a user selectable interface type 309 and a "modified_as" property 310 which may depict any kind of modifier applied to the identified word. In alternative embodiments, one skilled in the art may add any number of properties deemed suitable to the query model.

Figure 3B:
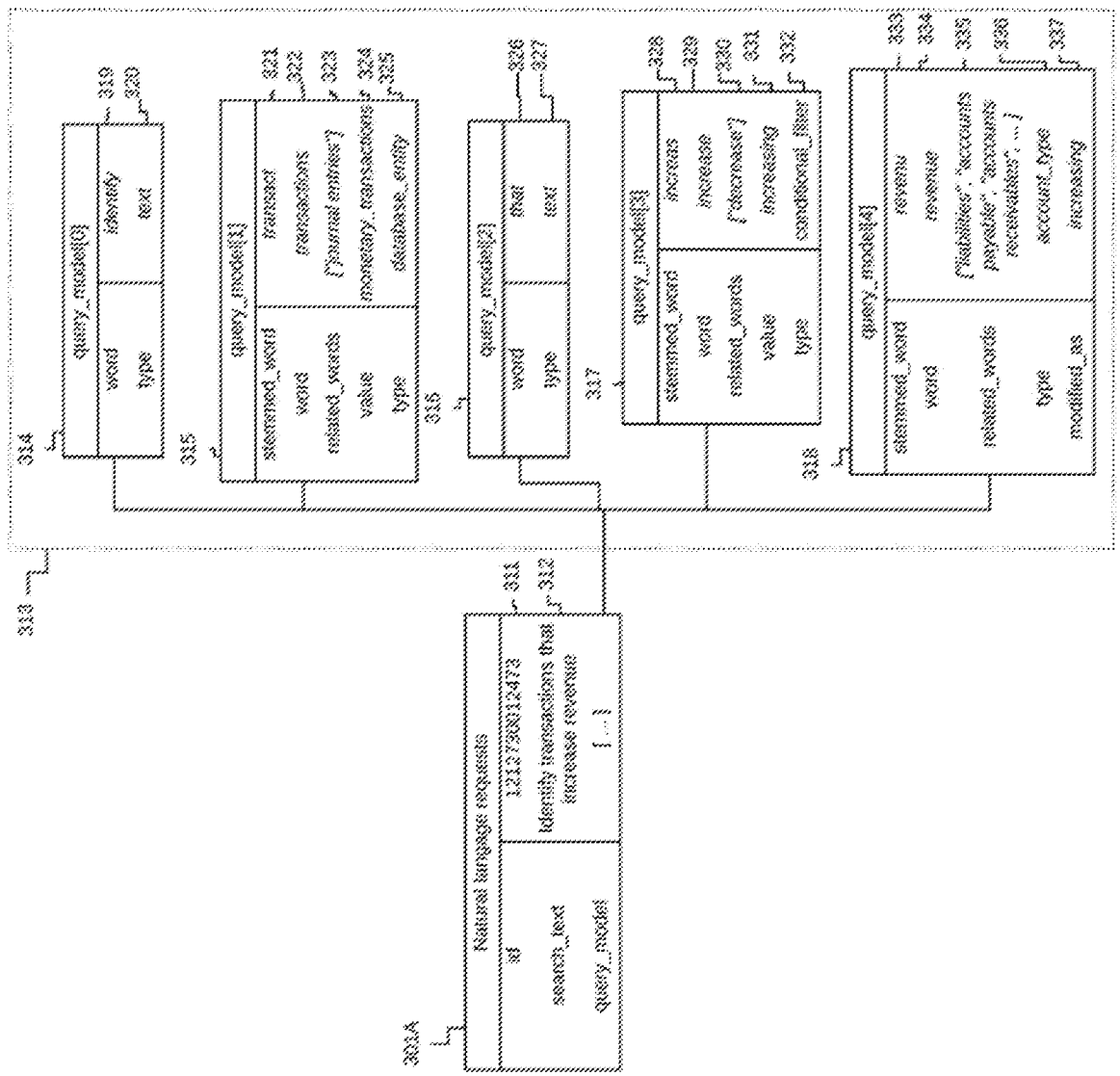

FIG. 3B depicts a sample implementation of the database table model of FIG. 3A. As shown, natural language requests table 301A is similar to the natural language requests table model 301 but has been populated with an example id "12122730012473" 311 and search text "Identify transactions that increase revenue" 312. Depicted are also many query model tables 313 which is similar to depiction of the query model table model 302 but has been populated and divided into sections by word into query model [0] 314, query model [1] 315, query model [2] 316, query model [3] 317 and query model [4] 318.

As shown in query model [0] 314, the first word of the natural language request is "identify" 319, which in this sample implementation has been simply given the property type of "text" 320 which, in this embodiment, is to indicate the word is not a queried element and should be ignored. Additional properties may be necessary in alternative embodiments to better define the word "identify" 319. As shown in query model [1] 315, the second word of the natural language request is "transactions" 322 in this sample implementation. As shown, the word "transactions" 322 has been stemmed from stemmed word "transact" 321 and also includes a list of alternative elements. In this example, only "journal entries" 323 is listed as alternative elements to the word "transactions" 322, though a plurality of alternative elements or "related-words" could be listed. A value is also assigned to query model [1] 315 which could represent any possible significant quality that may be deemed important based on some form of assessment. In the case of the word "transactions" 322 in the example of FIG. 3B, a value of "monetary transactions" 324 is assigned to the query model of the word "transactions" 322, wherein the value of "monetary_transactions" 324 is a collection name in a database which may contain transactional information. To aid in the characterization of the word, an additional type property is also added which in this sample implementation for the word "transactions" 322 is type property "database_entity" 325.

As shown in query model[2] 316, the third word of the natural language request is "that" 326, which in this sample implementation has been simply given the property type of "text" 327. Additional properties may be necessary in alternative embodiments to better define the word "that" 326. As shown in query model[3] 317, the fourth word of the natural language request is "increase" 329. As shown, the word "increase" 329 has been stemmed from the stemmed word "increase" 328 and also includes a list of alternative elements. In this example, only its antonym "decrease" 330 is listed as an alternative element or "related-word" to the word "increase" 329, though a plurality of alternative elements could be listed. A value of "increasing" 331 is assigned to query model[3] 317 as well as a type of "conditional_filter" 332. Another appropriate type for query model[3] 317 of the word "increase" 329 in an alternative implementation may be "modifier". These properties are to aid in characterizing the word and help ease the processes which will be described herein below in detail.

As shown in query model[4] 318, the fourth word of the natural language request is "revenue" 334. As shown, the word "revenue" 334 has been stemmed from the stemmed word "revenu" 333 and also includes a list of alternative elements 335. In this example, the list of alternative elements or "related-words" includes a plurality of terms including "liabilities", "accounts payable" and "accounts receivable" 335. In this sample implementation, query model[4] 318 has a type of "account_type" 336 and a "modified_as" 310 property of "increasing" 337. The "modified_as" 310 property is to depict the relationship between the word "increase" 329 and "revenue" 334 since the former modifies the latter.

Figure 3C:
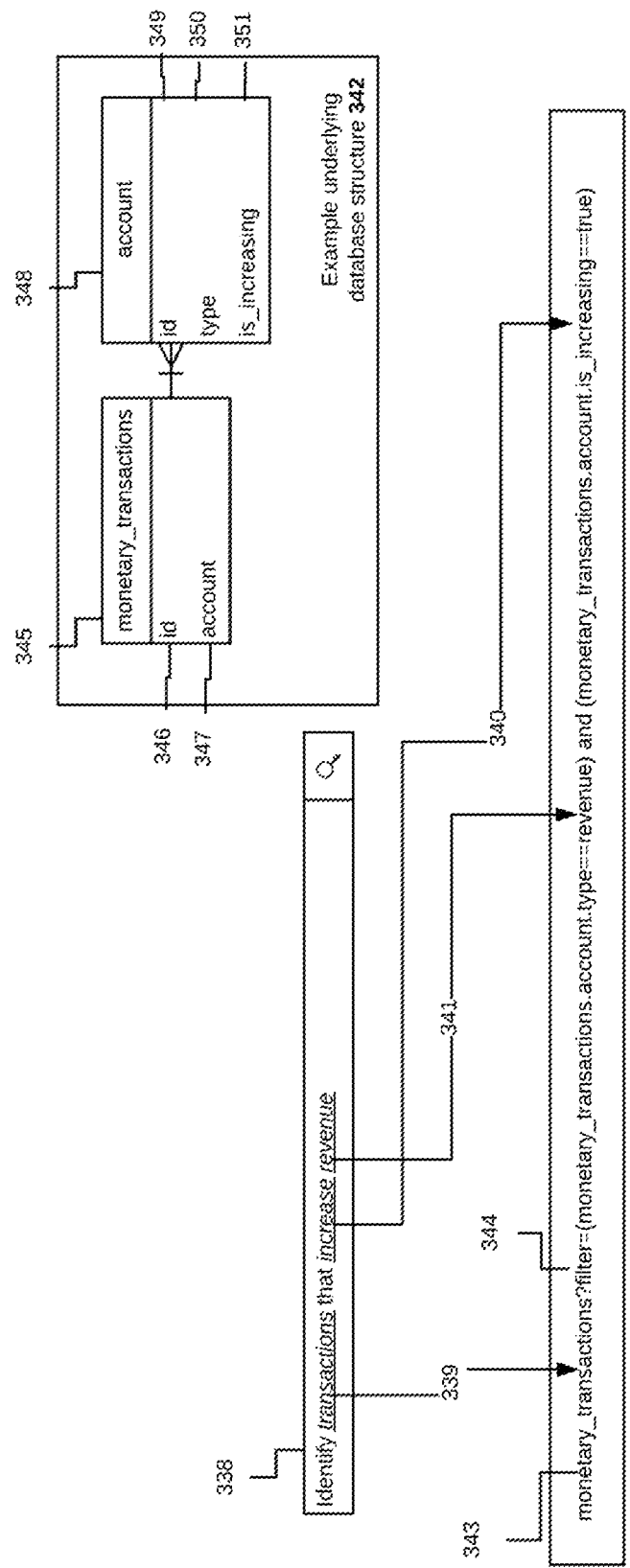
FIG. 3C is a depiction of the creation of a query according to an embodiment of the present invention using the result of logic within FIGS. 2B and 2C.

FIG. 3C depicts a sample implementation for a translation between the natural language request of FIG. 3B into a database query. A text box 338 containing a natural language request "Identify transactions that increase revenue" that may have been inputted by a user via some form of input is shown to create a database query in the form of a database query 343. As shown in FIG. 3C, the database query 343 is excluding information not pertaining to this current embodiment such as, but not limited to, an address, port, protocol etc.

In this sample implementation, the database query 343 begins with the name of a database collection 339. Referencing FIG. 3B and the query model[1] 315 that includes the second entry "transactions" 322 which has a type of "database_entity" 325 and value of "monetary_transactions" 324, the natural language statement processing system 106 may deduce this to be the subject of the sentence and therefore assign "monetary_transactions" 324 to be the database collection 339 to perform a query on. Modifier words preceding the subject of the sentence may also affect the kind of query performed. In this sample implementation, there are no modifiers to any subject, however one skilled in the art would understand that changing the word "identify" 319 in this natural language request to say for example "count" may change the query performed. This alternative implementation of the invention could have a database query 343 find the count of all transactions instead of simply finding all transactions. Therefore, in the sample implementation of FIG. 3C, the lack of modifiers to the subject "transactions" 322 is specifying that attempts to find all transactions should be performed.

After the database collection 339, the database query 343 comprises a question mark and the word "filter" 344 in the sample implementation of FIG. 3C, where the question mark and word "filter" 344 signifies a beginning of one or more filter parameters. This is to signify to a database that receives the database query 343 that a subset of the original request is being queried. Using a custom query language that may take many forms, the database query 343 may define conditions to create a subset of results from the query to the database collection 339. The query may be separated into two sections divided by the word and, or some other symbol that symbolizes the union of two separate entities, and wrap each section in parentheses.

In the sample implementation of FIG. 3C, filter parameters with separate values will be checked between single or multiple properties within the database collection "monetary_transactions" 339. These properties to filter on can be extracted directly from the natural language request. In this sample implementation, the words identified as such are "increase" 329 and "revenue" 334 that create a first filter parameter 340 and a second filter parameter 341. For the first filter parameter 340, referencing an example of an underlying database table model "monetary_transactions" 345, which could possibly be stored within the database 103 of FIGS. 1A and 1B according to one embodiment of the present invention, the database table model "monetary_transactions" 345 may store as properties an "id" 346 used to identify the monetary transaction and an "account" database table 347. The "monetary_transactions" table model 345 may encompass a large amount of entries pertaining to all current, past and future monetary transactions that a user or multiple users may enter. The account table model 348 may have one or more relationships with the "monetary_transactions" table model 345 which means that, for every monetary transaction, there may be multiple accounts. The account table model 348 may contain the properties of "id" 349 which may identify the account, a "type" 350 which may identify the type of the account and an "is_increasing" 351 property which can be used to filter using an equivalence check on the value "increasing" 331 found in the natural language request which changes to a simple value of true due to the "is_increasing" 351 property contained in the account database table model 348 being a boolean in the sample implementation. The resulting portion of the database query 343 for the first filter parameter 340 may be structured as (monetary_transacations.account.is.increasing==true) in one particular implementation, though alternative structures could be used. Similarly, for the second filter parameter 341, the word "revenue" 334 may reference the properties of the database table model "monetary_transactions" 345 as well as the properties of the database table model "account" 348 and it's property "type" 350 which may be used to filter using an equivalence check on the value "revenue" 334 found in the natural language request. The resulting portion of the database query 343 for the second filter parameter 341 may be structured as (monetary_transacations.acount. type==revenue) in one particular implementation, though alternative structures could be used. The resulting database query 343 may be a combination of the database collection "monetary_transactions" 339, the first filter parameter 340 and the second filter parameter 341. In one particular structure, the database query 343 could comprise "monetary_transacations?filter=(monetary_transacations.account.is.increasing==true) and (monetary_transacations.acount. type==revenue)", though alternative structures could be used. Somebody skilled in the art would understand the checks, value conversion, database table selections and more will be decided pragmatically depending on the context of the sentence, the underlying database structure, the values present in the database and the domain or scope this natural language request is referencing.

Figure 3D:
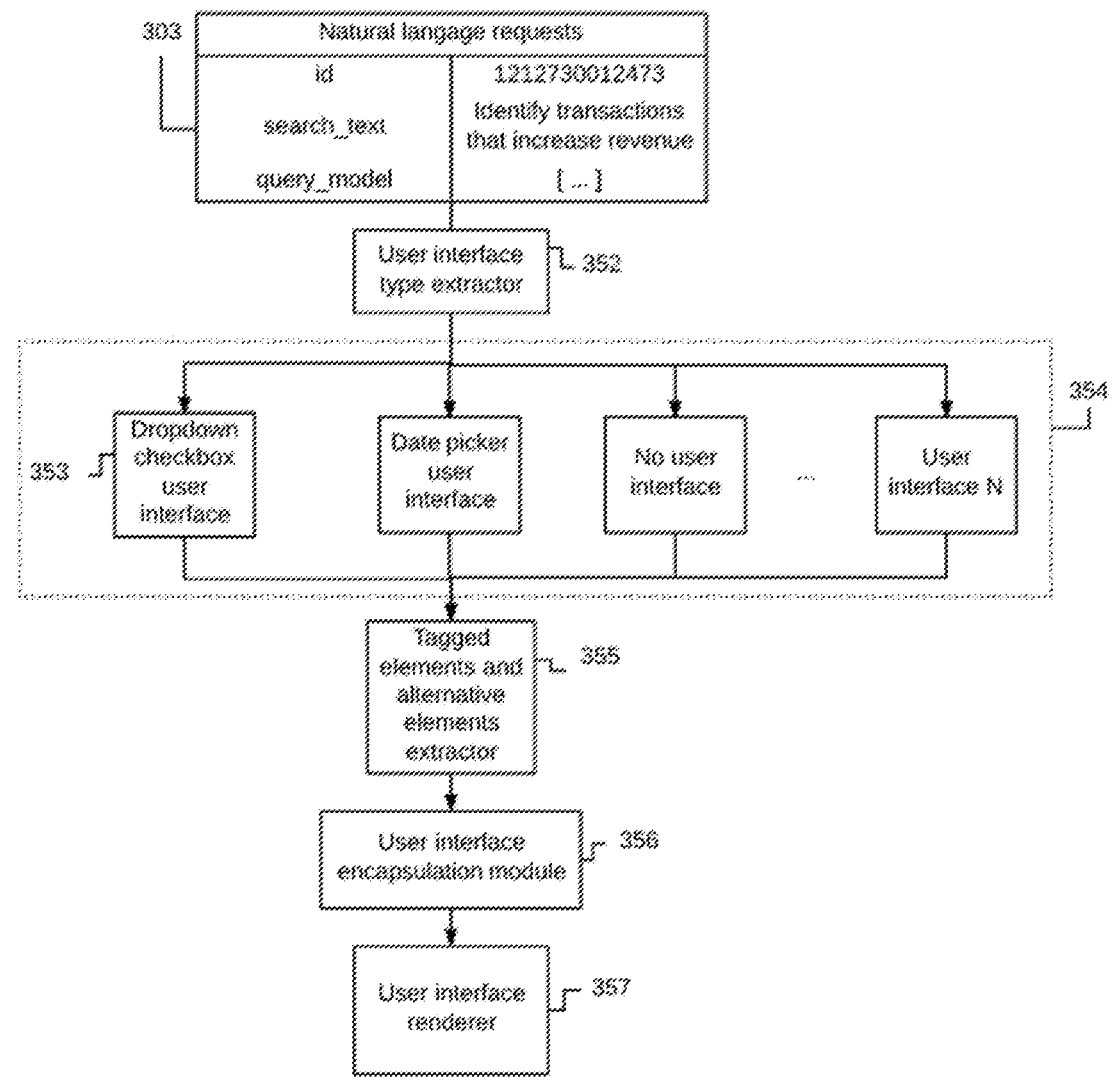
FIG. 3D is an architectural diagram of a client side system according to an embodiment of the present invention.

FIG. 3D is a system for generating a visual representation of the natural language request and a user interface for adjusting the natural language request according to one embodiment of the present invention. Referencing FIG. 3B, the system of FIG. 3D is initiated by receiving a natural language requests table such as the natural language requests table 301A. The system comprises a user interface type extractor 352 to extract and classify the query models to decipher the most suitable user interfaces based on the properties defined in the query model. For example in this sample implementation the query_model[4] 318 may contain a type of "account_type" 336 as well as an array of list of alternative elements in the "related_words" 335 property. Using this information, the user interface type extractor 352 could decipher the appropriate user interface may be the Dropdown checkbox user interface 353 to display this information accurately. As shown in FIG. 3D, the selection of user interfaces may include 0 to N user interfaces 354 including, but not limited to drop down menus containing checkboxes or radio buttons, a date picker user interface or no user interface at all. The user interfaces described herein should not limit the scope of the present invention as many other user interface options are known by one skilled in the art.

The system of FIG. 3D may further comprise a tagged elements and alternative elements extractor 355 to determine elements in the natural language request to tag and elements to present as alternatives to elements within the natural language request. These elements may vary depending on the kind of user interface that the word has been classified as. The system of FIG. 3D may further comprise a user interface encapsulation module 356 to encapsulate elements of the natural language request in separate objects, grouped and ordered to prepare for visualization. The system of FIG. 3D may further comprise a user interface renderer 357 to render the encapsulated container containing all user interfaces and their properties. The rendered output may be transmitted to a computing apparatus for the user.

Figure 4A:
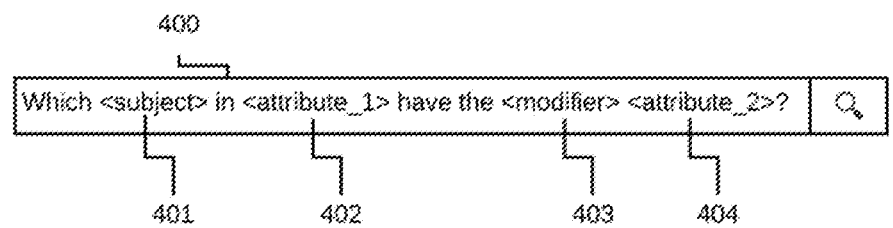
FIG. 4A, 4B, 4C, 4D are depictions of multiple generic examples of attributed natural language requests according to an embodiment of the present invention.

FIG. 4A shows a generic example of a model representation of a natural language request 400 in which most of the words have been replaced with a denotation of the classification of that word. The words with denotations are deemed to potentially be queried elements. The specific structure and classifications of the example of FIG. 4A are not meant to limit the scope of the invention and other query structures that may include a different set of queried elements may be used in other implementations. The first queried element in the natural language request of FIG. 4A is subject 401. The subject 401 may be modified in some requests and there may be multiple subjects in a natural language request in which case multiple database queries may be necessary. The next queried element in the natural language request of FIG. 4A is attribute "attribute_1" 402. An attribute such as "attribute_1" 402 may be an attribute or property to the subject 401 or to any other single or multiple word(s) in the natural language request. The next queried elements in the natural language request of FIG. 4A are modifier 403 and attribute "attribute_2" 404. A modifier such as modifier 403 may modify any single or multiple word of interest or queried element, including the subject 401. In this example, the modifier 403 is modifying "attribute_2" 404 due to it's preceding nature. In other implementations, a modifier could come before or after it's modified attribute. "attribute_2" 404 may be an attribute or property to the subject 401 or to any other single or multiple word(s) in the natural language request. This "attribute_2" 404 however may have been modified by its preceding modifier 403.

Figure 4B:
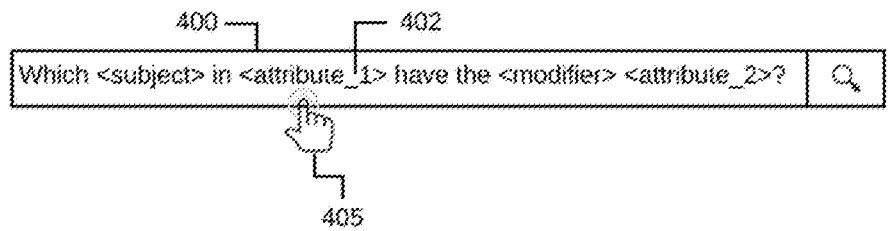
Figure 4C:
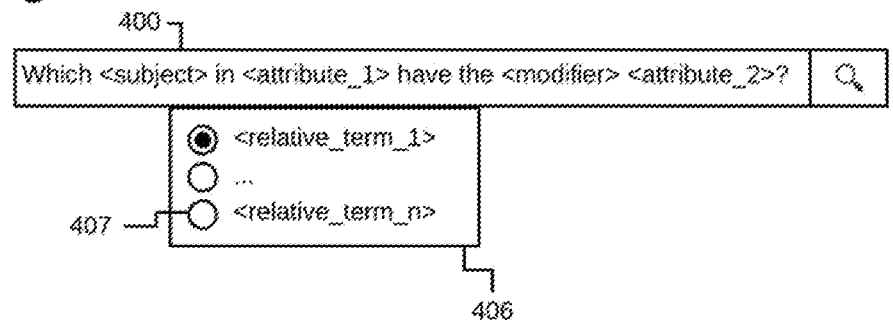

FIG. 4B illustrates the model representation of the natural language request 400 of FIG. 4A along with a user selection indication 405 selecting on the generic attribute "attribute_1" 402. In this figure, only a single selection has been shown however the user may select any of the words in the natural language request which, in this current illustration, have been replaced with a generic denotation. FIG. 4C illustrates the model representation of the natural language request 400 of FIG. 4A along with a dropdown menu containing radio buttons 406, which is one possible implementation of a user selectable interface. Another alternative user selectable interface may be a dropdown containing checkboxes, comprising a series of relative terms that each could be an alternative element to the queried element. Referencing FIG. 3D, the classification of using a dropdown menu may have been attributed to the object "attribute_1" 402. The series of relative terms, denoted as "relative_term_1" to "relative_term_n" 407, may have been extracted from a query model's "related_words" property established for the word and may be alternative elements to the queried element.

Figure 4D:
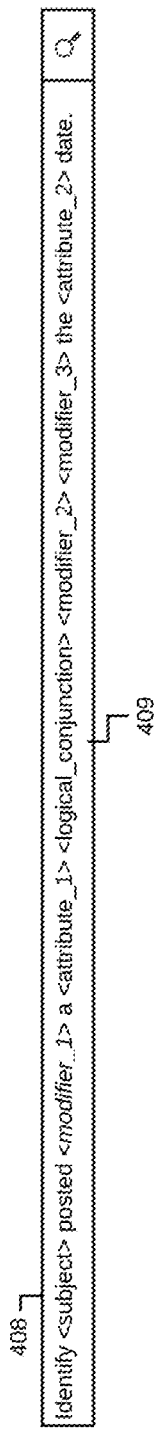

FIG. 4D depicts another generic example of a model representation of a natural language request 408 in which most of the words have been replaced with a denotation of the classification of that word in the same fashion as FIG. 4A. In this example, the natural language request 408 comprises a "logical_conjunction" 409. Possible examples of these logical conjunction 408 may be "and", "or" or "and not". The logical conjunction 409 may be a separator to the query statement created based on any coordinating conjunctions possibly found in the natural language request 408. The purpose of FIG. 4D is to demonstrate abstractly how a machine breaks down the uttered request into detailed elements which may be related. Subsequent example will demonstrate how this is used in less abstract form with English language expressions which may or may not contain conjunctions.

Figure 5A:
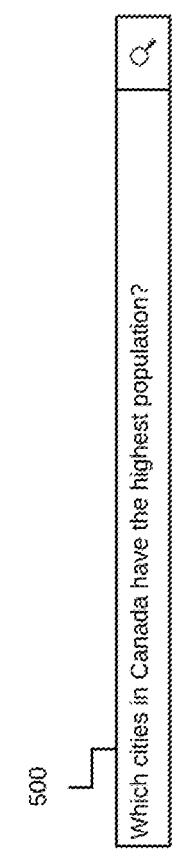
FIGS. 5A, 5B, 5C are depictions of a natural language request in which a user selection is made according to a sample implementation of the present invention.

FIG. 5A shows an example of a natural language request entered by a user which in this case is entered using a search box 500. A search box such as search box 500 is one of the possible input user interfaces in which a natural language request may be inputted; though it should be understood that other variations of an input user interface could be used. As shown in FIG. 5A, the natural language request in this example is "Which cities in Canada have the highest population?".

Figure 5B:
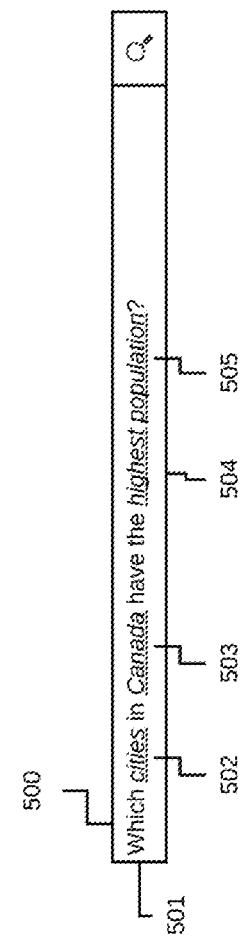

FIG. 5B showcases an example of the natural language request of FIG. 5A in the search box 500 with a potential visual representation of the outputted model representation for the natural language request 501 in this sample implementation. The underlined words in the model representation for the natural language request 501 are possible queried elements. The first example of a queried element in the model representation for the natural language request 501 shown in FIG. 5B is "cities" 502 which, referencing the generic example of FIG. 4A, is an example of the subject 401. The subject 401 could have possibly been tagged with properties such as "type" which may classify "cities" 502 as a distinct location or area. Other properties attributed to "cities" 502 may include a list of "related_words" such as towns, metropolitan areas, villages, etc. Further, as shown in FIG. 5B, the model representation for the natural language request 501 comprises queried element "Canada" 503 which, referencing the generic example of FIG. 4A, is an example of an attribute or more specifically "attribute_1" 402 of FIG. 4A. The "attribute_1" 402 may be classified as a "type" of country and may reference a database collection as a property. This referenced database may contain information such as the GDP of each country or any number of properties pertaining to countries that may be suitable for storage and extraction including, but not limited to, potentially a list of countries or a list of similar countries such as those with similar financial information (i.e. GDP, GDP/capita, inflation, etc.), geography, history or other defining characteristics. The referenced database may also reference an external database, or storage device, found at a certain IP address with possibly additional information required such as credentials. Further, as shown in FIG. 5B, the model representation for the natural language request 501 comprises of queried elements "highest" 504 and "population" 505 which, referencing the generic example of FIG. 4A, are examples of a modifier 403 and an attribute such as "attribute_2" 404 respectively. In this example, the modifier 403 of "highest" 504 is related to the "attribute_2" 404 of "population"505. In this example, a possible property of the queried element "highest" 504 may be a reference to the queried element population 505. Additionally, it may include properties such as a type deeming "highest" 504 as a modifier of another queried element. Any number of properties may be used to describe any of the queried elements or to additionally describe the properties of the queried elements.

Figure 5C:
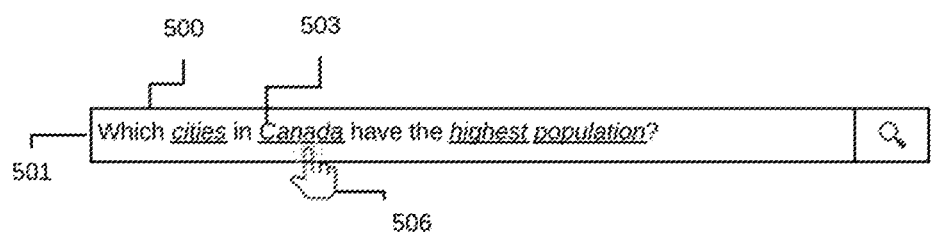

FIG. 5C illustrates the model representation of the natural language request 501 of FIG. 5B along with a user selection indication 506 on the queried element "Canada" 503. Referencing the generic example of FIG. 4B, this is an example of a user selection indication 405 selecting on the "attribute_1" 402. In FIG. 5C, a mouse pointer click action is shown as the user selection indication 506, however it should be understood that any number of possible user selection indications could be used. For instance, in some embodiments, speech may be used to provide user selection indication with the speech being interpreted by a computing apparatus to determine the user's user selection. The user selection indications in some embodiments may also be made in a physical system of computation, such as a computer, or in some form of virtual reality using a virtual reality system.

Figure 5D:
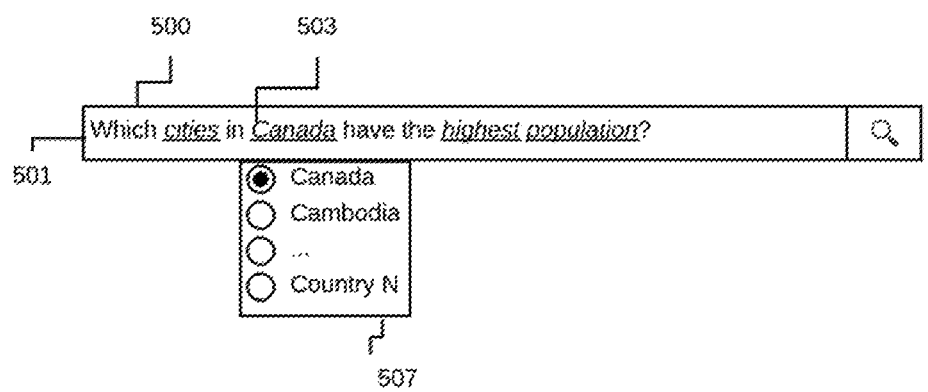
FIG. 5D, 5E, 5F are depictions of a user selection of an alternative element made according to a sample implementation of the present invention.

FIG. 5D illustrates the model representation of the natural language request of FIGS. 5B and 5C along with a dropdown menu 507 triggered by the user selection indication 506 shown in FIG. 5C. Referencing the generic example of FIG. 4B, the dropdown menu 507 of FIG. 5D comprises a list of alternative elements for the queried element of "Canada" 503 such as a list of other countries. The alternative elements may represent alternative intents for subsequent database queries that the user may want to initiate using one of the alternative elements instead of the queried element. The alternative elements may comprise a list within the query model table for the subject "Canada" 503. In some examples, the alternative elements could be countries that are similar alphabetically, similar in industrial development, similar in financial situation such as GDP/capita. Similarly in another attribute such as "population" 505, are members of an organization such as the OECD, UN, NATO, NAFTA, WTO or similar in another manner that one skilled in the art may contemplate. The dropdown menu 507 is one example of a possible user selectable interface that may be displayed to the user after the queried element is selected as per the action of FIG. 5C. In this case, the dropdown menu 507 seems suitable for the reason that the user may want to select a different country from a list, however there may be other circumstances that may deem an alternative user selectable interface, such as a date picker as will be described with reference to FIGS. 7A-7D.

Figure 5E:
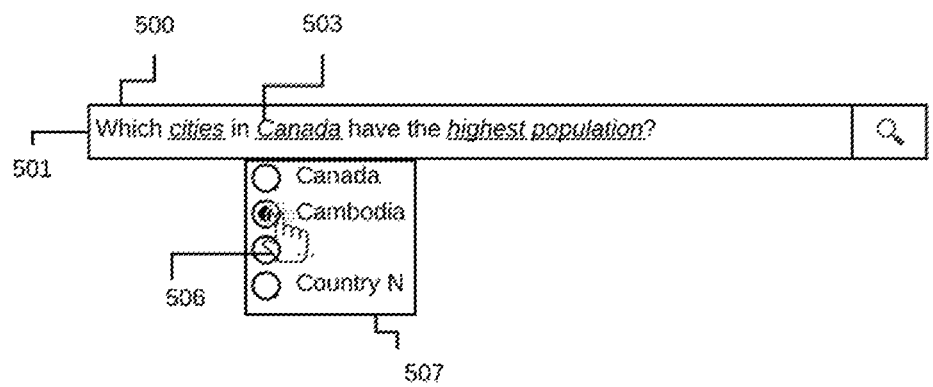

FIG. 5E illustrates the model representation of the natural language request of FIGS. 5B and 5C along with the dropdown menu 507. In FIG. 5E, the user is making a selection within the dropdown menu 507 using the user selection indication 506. In this example, the user is selecting the context term "Cambodia" from the dropdown menu 507 to become a new queried element of the natural language request. This selection could have been made using other forms of a user selectable interface and the use of a clickable dropdown menu should not limit the scope of the present invention. In response to the user selecting a new queried element to be "Cambodia", a new database query may be initiated.

Figure 5F:
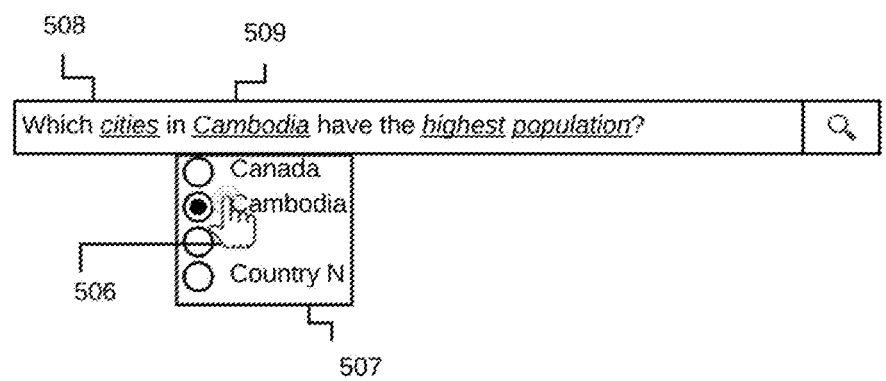

FIG. 5F illustrates the sample implementation of FIG. 5E after the user has selected "Cambodia" 509 as a new queried element for the natural language request using the user selection indication 506. After the selection has been made, the queried element that was previously shown as "Canada" 503 is changed to the newly selected queried element "Cambodia" 509. This is shown in the amended natural language request in the search box 500 which now states "Which cities in Cambodia have the highest population?". The contents of the dropdown menu 507 may stay the same, as shown in FIG. 5F, or may change to pull in a series of alternative elements listed in the query model table for the word "Cambodia". In one case, the queried element "Canada" could have alternative elements comprising a list of countries similar alphabetically while "Cambodia" could have alternative elements comprising a list of countries similar geographically, thus potentially eliminating "Canada" from the alternative elements in the dropdown menu 507. It should be understood that the sample implementation of FIGS. 5A-5F is just one specific situation and should not limit the scope of the present invention.

Figure 6A:
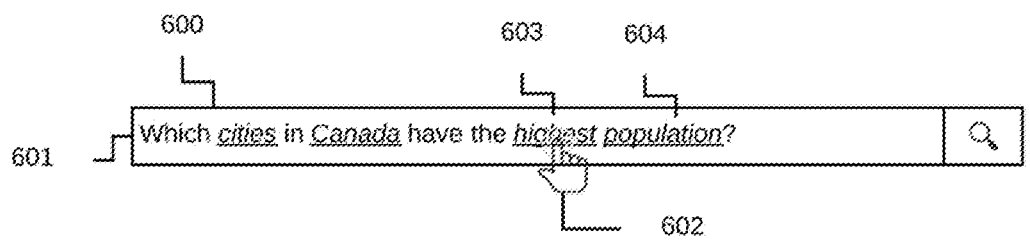
FIGS. 6A, 6B, 6C, 6D are depictions of a user selection of a modifier element and its visual representation of alternatives elements made according to a sample implementation of the present invention.

FIG. 6A illustrates an example of a natural language request 601 entered by a user which in this case is entered using a search box 600. A search box such as search box 600 is one of the possible input user interfaces in which a natural language request may be inputted; though it should be understood that other variations of an input user interface could be used. As shown in FIG. 6A, the natural language request in this example is "Which cities in Canada have the highest population?". FIG. 6A also displays the potential visual representation of the outputted model representation for the natural language request 601 in this sample implementation. The underlined words in model representation for the natural language request 601 are possible queried elements. Further, as shown in FIG. 6A, the user is making a selection, shown using a user selection indication 602, on the queried element "highest" 603 which, referencing the generic example of FIG. 4A, is an example of a modifier 403. In this example, the modifier 403 of "highest" 603 is related to the "attribute_2" 404 of "population" 604. In this example, a possible property of the queried element "highest" 603 may be a reference to the queried element population 604. Additionally, it may include properties such as a type deeming "highest" 603 as a modifier of another queried element. Any number of properties may be used to describe any of the queried elements or to additionally describe the properties of the queried elements. In FIG. 6A, a mouse pointer click action is shown as the user selection indication 602, however it should be understood that any number of possible user selection indications could be used.

Figure 6B:
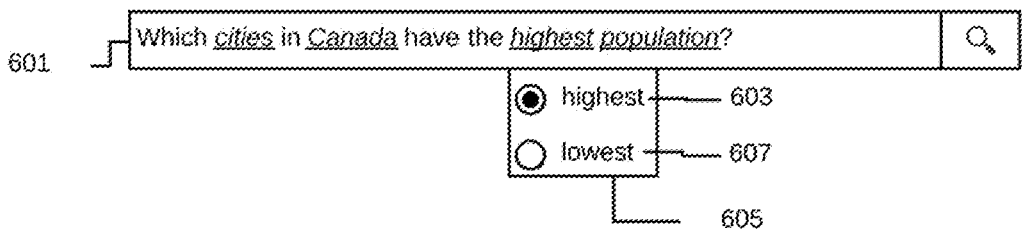
Figure 6C:
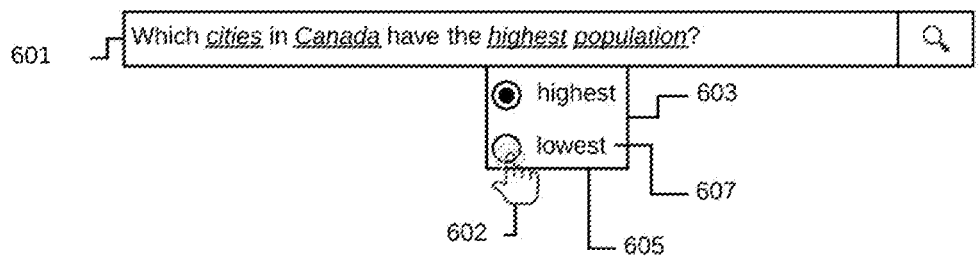
Figure 6D:
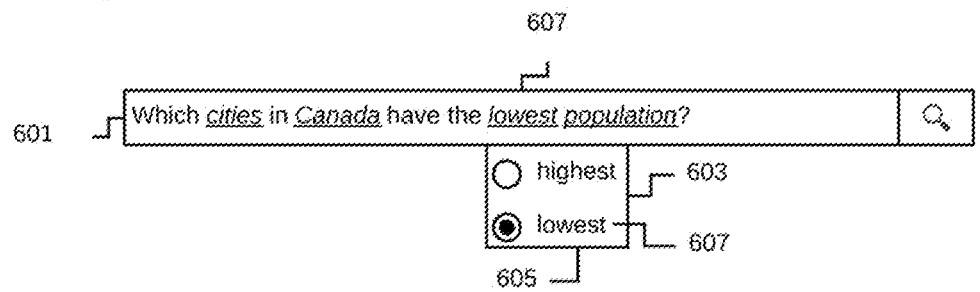

FIG. 6B illustrates the model representation of the natural language request 601 of FIG. 6A along with a dropdown menu 605 triggered by the user selection indication 602 shown in FIG. 6A. Referencing the generic example of FIG. 4B, the dropdown menu 605 of FIG. 6B comprises the queried element "highest" 603 and a list of alternative elements or "related-words" for the queried element of "highest" 603 such as it's antonym "lowest" 607. The alternative element "lowest" 607 may represent an alternative intent for a database query that the user may want to initiate using the alternative element instead of the queried element. In FIG. 6C, the user is making a selection within the dropdown menu 605 using the user selection indication 602 on the alternative element "lowest" 607. In FIG. 6D, with this new selection, the modifier "highest" 606 has been unselected and the modifier "lowest" 607 has become the selected modifier. After the selection has been made, the queried element for the modifier that was previously shown as "highest" 603 is changed to the newly selected subject "lowest" 610 in the model representation of the natural language request 601. In that case, the alternative element "lowest" 610 would replace "highest" 603 within the natural language request 601 presented to the user and the alternative element "lowest" 610 would be used in a resulting database query.

Figure 7A:
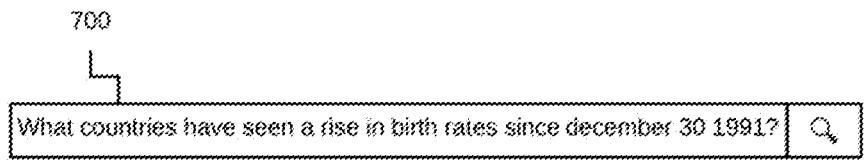
FIGS. 7A, 7B, 7C, 7D are depictions of a user selection of an attributed date element and its visual representation of its alternative elements made according to a sample implementation of the present invention.

FIG. 7A illustrates an example of a natural language request entered by a user which in this case is entered using a search box 700. A search box such as search box 700 is one of the possible input user interfaces in which a natural language request may be inputted; though it should be understood that other variations of an input user interface could be used. As shown in FIG. 7A, the natural language request in this example is "What countries have seen a rise in birth rates since december 30 1991?".

Figure 7B:
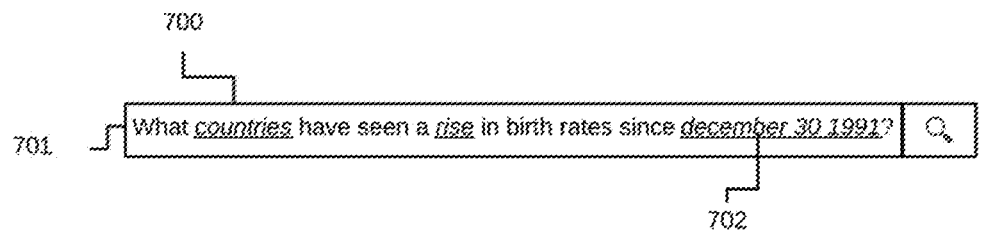
Figure 7C:
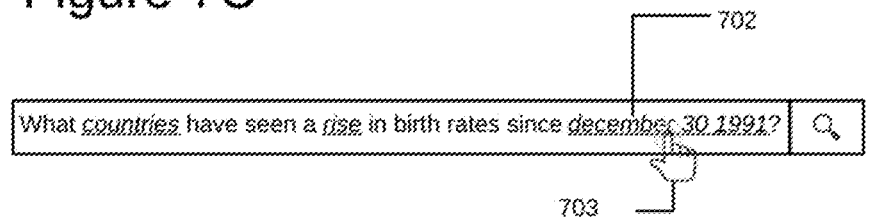
Figure 7D:
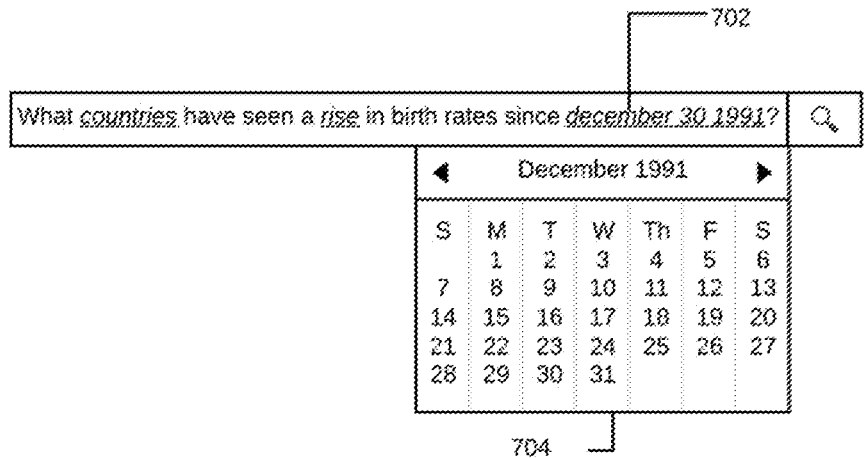

FIG. 7B showcases the example natural language request of FIG. 7A in the search box 700 with a potential visual representation of the outputted model representation for the natural language request 701 in this sample implementation. The underlined words in model representation for the natural language request 701 are possible queried elements. In this example, a queried element "december 30 1991" 702 is identified which, referencing the generic example of FIG. 4A, is an example of an attribute or more specifically "attribute_1" 402 of FIG. 4A. Additionally this queried element may have a property "type" of date. In FIG. 7C, the user is shown to be making a selection using a user selection indication 703 on the queried element "december 30 1991" 702 which, referencing the generic example of FIG. 4A, is an example of an attribute or more specifically "attribute_1" 402. FIG. 7D illustrates the model representation of the natural language request 701 of FIG. 7A along with a date picker 704 user interface triggered by the user selection indication 703 shown in FIG. 7C. This date picker 704 user interface is an example of a user interface that may be used to display a queried element with a type property of date with the various date options being presented as alternative elements. The alternative element, such as a new date, may represent an alternative intent for a database query that the user may want to initiate using the alternative element instead of the queried element. Other alternative user interfaces may be used such as a dropdown menu for each separate section of the date such as month, year and day however it should be understood that any number of possible user interfaces could be used. Using the date picker 704, the user may select an alternative date as an alternative element to the queried element "december 30, 1991". In that case, the alternative element would replace "december 30, 1991" within the natural language request 701 presented to the user and the alternative element would be used in a resulting database query.

Figure 8A:
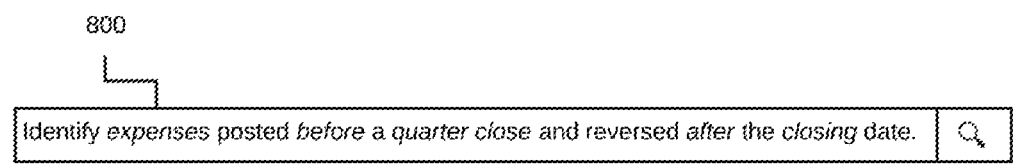
FIGS. 8A, 8B, 8C are depictions of a user selection of a modifier element and its visual representation of alternative elements made according to a sample implementation of the present invention.

FIG. 8A illustrates an example of a natural language request entered by a user which in this case is entered using a search box 800. A search box such as search box 800 is one of the possible input user interfaces in which a natural language request may be inputted; though it should be understood that other variations of an input user interface could be used. As shown in FIG. 8A, the natural language request in this example is "Identify expenses posted before a quarter close and reversed after the closing date".

Figure 8B:
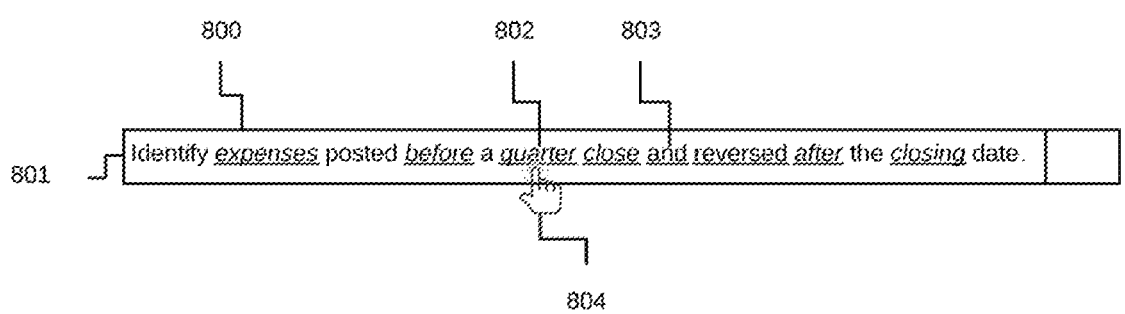
Figure 8C:
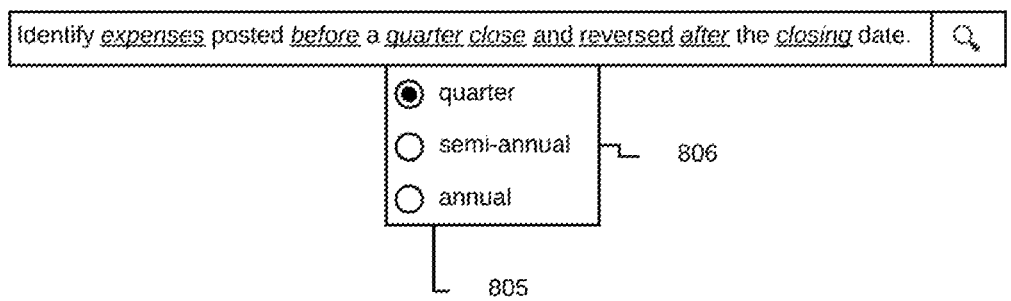

FIG. 8B showcases the example natural language request of FIG. 8A in the search box 800 with a potential visual representation of the outputted model representation for the natural language request 801 in this sample implementation. The underlined words in model representation for the natural language request 801 are possible queried elements. In this example a queried element "quarter" 802 is identified which, referencing the generic example of FIG. 4A, is an example of an attribute or more specifically "attribute_1" 402 of FIG. 4A. Other properties attributed to "quarter" 802 may include a list of alternative elements or "related_words" such as "semi-annual", "annual" etc. The alternative elements may represent alternative intents for a database query that the user may want to initiate using one of the alternative elements instead of the queried element. Furthermore, a queried element of "and" 803 is also identified which, referencing the generic example of FIG. 4D, is an example of a "logical_conjunction" 409 of FIG. 4D. Other properties attributed to "and" 803 may include a list of alternative elements or "related_words" such as "or". Many other queried elements have been identified, however they have not been explicitly defined here. Any number of properties may be used to describe any of the queried elements or to additionally describe the properties of the queried elements. In FIG. 8B, a mouse pointer click action is shown as a user selection indication 804 selecting the queried element "quarter" 802, however it should be understood that any number of possible user selection indications could be used. FIG. 8C illustrates the model representation of the natural language request 801 of FIG. 8B along with a dropdown menu 805 triggered by the user selection indication 804 selecting the queried element "quarter" 802. Referencing the generic example of FIG. 4B, the dropdown menu 805 of FIG. 8C comprises a list of alternative elements for the queried element of "quarter" 802 such as "semi-annual" 806. The user may then make a selection on any of the alternative elements listed within the dropdown menu 805. If selected, the alternative element would replace "quarter" 802 within the natural language request 801 presented to the user and the alternative element would be used in a resulting database query.

Figure 8D:
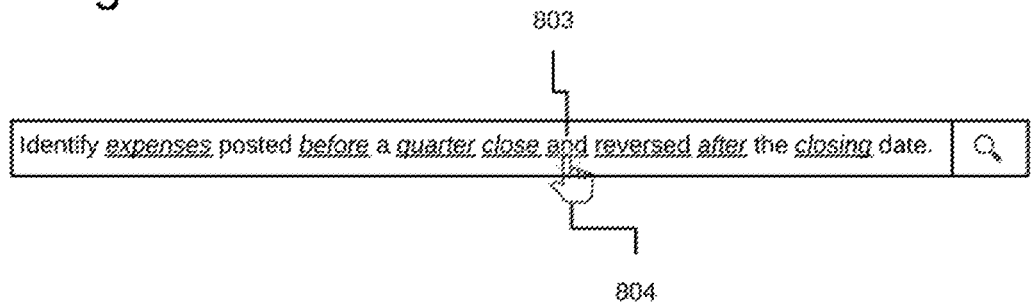
FIGS. 8D, 8E are depictions of a user selection of a logical conjunction element and its visual representation of alternative elements made according to a sample implementation of the present invention.
Figure 8E:
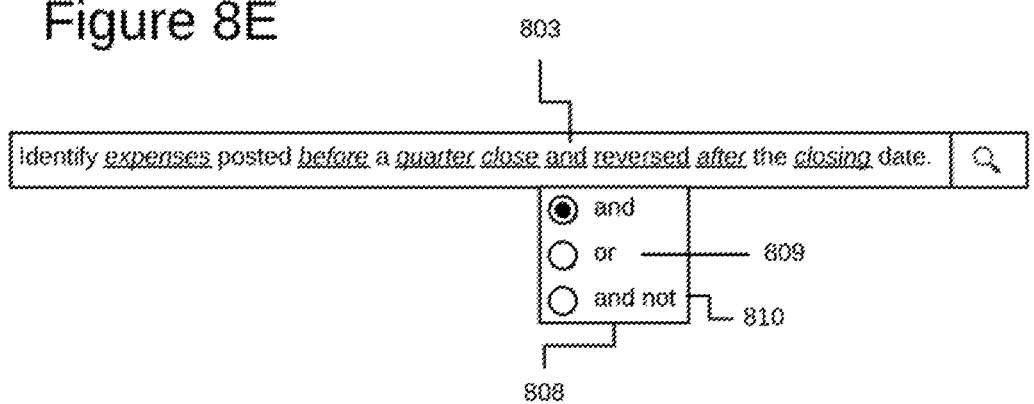

FIG. 8D illustrates the model representation of the natural language request 801 of FIG. 8B with the user making a selection using the user selection indication 804 on the queried element "and" 803 which, referencing the generic example of FIG. 4D, is an example of an "logical_conjunction" 409 of FIG. 4D. FIG. 8E illustrates the model representation of the natural language request 801 of FIG. 8B along with a dropdown menu 808 triggered by the user selection indication 804 selecting the queried element "and" 803. Referencing the generic example of FIG. 4B, the dropdown menu 808 of FIG. 8C comprises a list of alternative elements for the queried element of "and" 803 such as "or" 809 and "and not" 810. The alternative elements may represent alternative intents for a database query that the user may want to initiate using one of the alternative elements instead of the queried element. The user may then make a selection on any of the alternative elements listed within the dropdown menu 808. If selected, the alternative element would replace "and" 803 within the natural language request 801 presented to the user and the alternative element would be used in a subsequent database query.

In FIG. 8E, the original conjunction is in the form of an 'and' therefore both criterial in the request must be satisfied in the resulting data. The alternate elements 'or' 809 or 'and not' 810 change the logic and intent of the original request and would result in different results being returned. This is an example of the selectable elements supporting the creation of an alternate natural language request intent which enables the exploration of different results from the database. Logical conjunctions are one example of alternative elements that may be presented to a user to initiate a database query with an alternate intent.

Figure 8F:
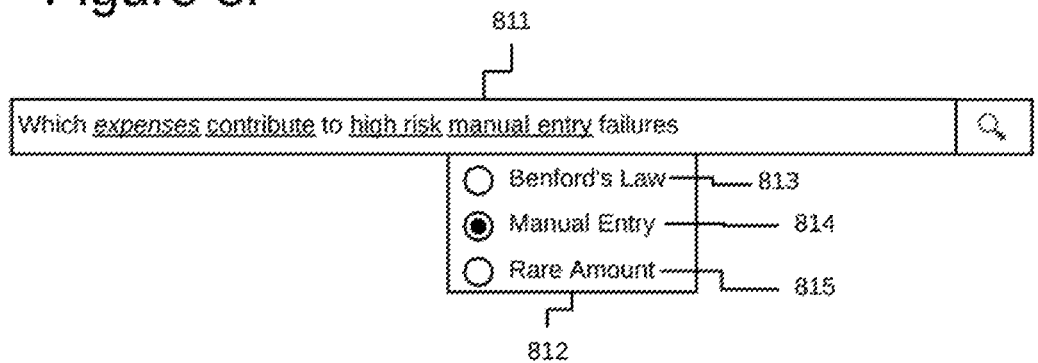
FIG. 8F is a depiction of a user selection of a type of problem element and its visual representation of alternative elements made according to a sample implementation of the present invention.

FIG. 8F illustrates a model representation of a natural language request 811 with a queried element "manual entry" 814 along with a dropdown menu 812 potentially triggered by a user selection of the queried element "manual entry" 814. The dropdown menu 812 of FIG. 8F comprises a list of alternative elements for the queried element of "manual entry" 814 such as "Benford's Law" 813 and "rare amount" 815. In this example, the queried element 814 is a type of problem identified in the request and other similar problems are suggested as alternative elements within the dropdown menu 812. The initial request referred to "manual entry" failures 814 while the alternate elements presented are other potential problem types or analyses that the user could select. The alternative elements may represent alternative intents for a database query that a user may want to initiate using one of the alternative elements instead of the queried element. The user may make a selection on any of the alternative elements listed within the dropdown menu 812. If selected, the alternative element would replace "manual entry" 814 within the natural language request 811 presented to the user and the alternative element would be used in a resulting database query instead of the queried element "manual entry" 814.

Figure 9:
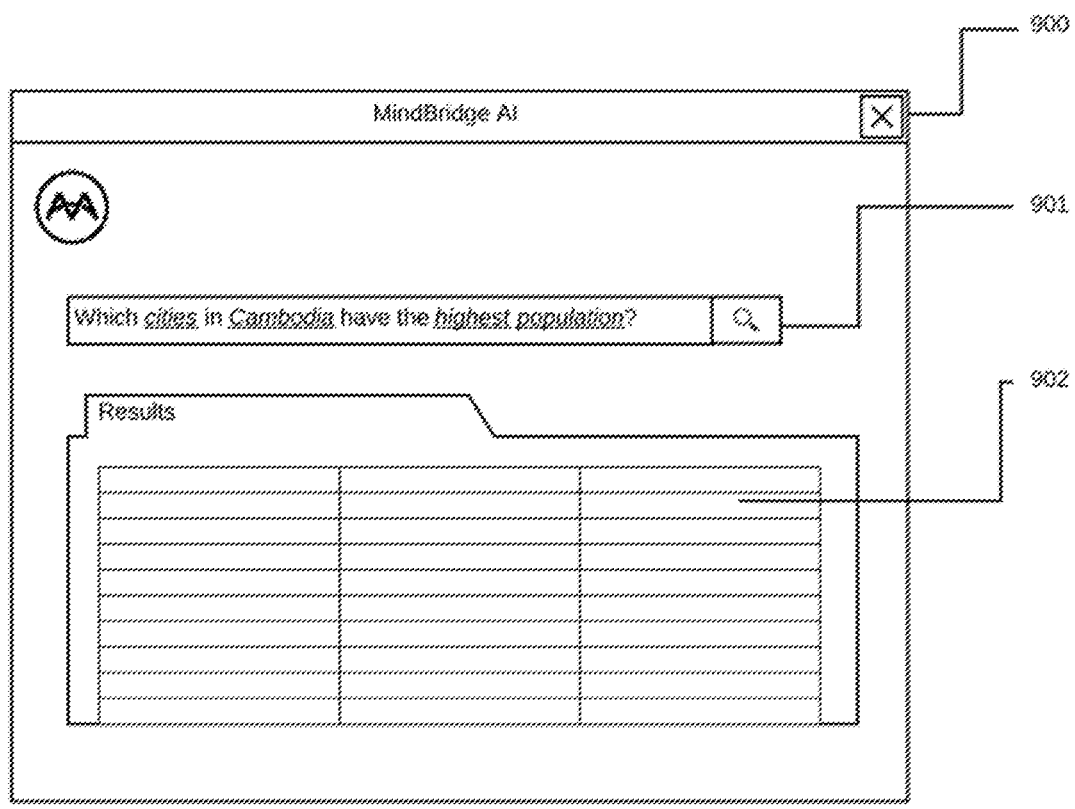
FIG. 9 is a depiction of a visual display including a visual representation of a natural language request and database query results according to a sample implementation of the present invention.

As described with respect to step 208 of FIGS. 2B and 2C, results from the database query may be displayed concurrently with a visual representation of the natural language request. FIG. 9 illustrates a visual display according to one embodiment of the present invention in which a user interface 900 includes a natural language request 901. The natural language request 901 includes selectable elements derived from the natural language request. Additionally, in this embodiment is a view of the results of the database query 902 from the system shown as a grid. Presented in FIG. 9, the results of the database query 902 is a grid, however other forms of communication between the system and the user could be used. In some embodiments, the results of the database query could be displayed in charts, geographic renderings such as maps or other visual representations, or could be provided to the user in an auditory representation or a physical representation, such as three-dimensional renderings.

Figure 10:
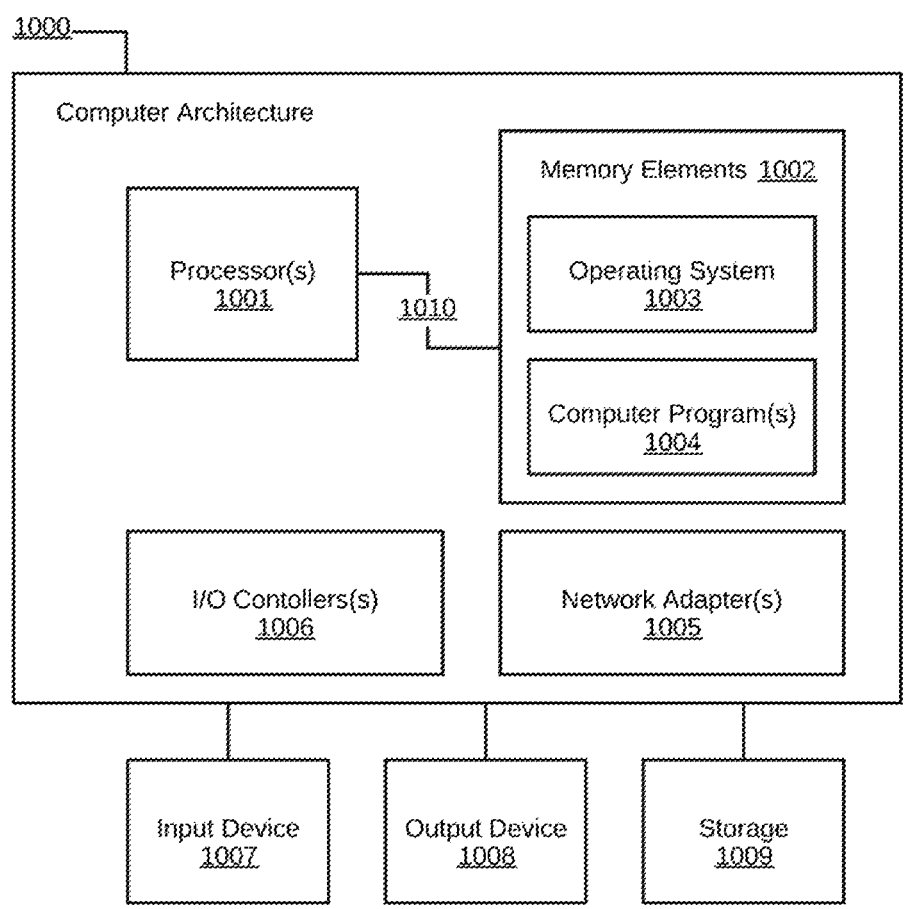
FIG. 10 is a block diagram of a computing architecture for data processing that may be utilized within embodiments of the present invention.

FIG. 10 illustrates a block diagram of a computing architecture 1000 for data processing that could be used to implement systems such as natural language processing system 106 in various embodiments of the present invention. In this illustrative example, the computing architecture system 1000 comprises a communications bus 1010 which provides communications between a processor 1001 and a memory 1002. Also shown, the computing architecture system 1000 comprises storage 1009, one or more network adaptors 1005, an input/output controller 1006, a user input device 1007 such as a keyboard, and an output device 1008 such as a visual display.

The processor 1001 executes instructions loaded into memory 1002. The processor 1001 may be a set of one or more processors or may be a multi-processor core. Further, the processor 1001 may be implemented using one or more heterogeneous processor systems in which a main processor is present with secondary processors on a single chip. As another illustrative example, processor unit 1001 may be a combination of general purpose and special purpose processor units. Special purpose processors include technologies such as GPUs (Graphical Processing Unit) which can be used to process data or FPGAs (Field Programmable Gate Arrays) or ASICs (Application Specific Integrated Circuit). The processor 1001 may further comprise combinations of the aforementioned.

Memory 1002 and persistent storage 1009 are examples of storage devices. A storage device is any piece of hardware that is capable of storing information, such as, for example without limitation, data, program code in functional form, and/or other suitable information either on a temporary basis and/or a permanent basis. Memory 1002, in these examples, may be, for example, a random-access memory or any other suitable volatile or non-volatile storage device. Storage 1009 may take various forms depending on the particular implementation. For example, storage 1009 may contain one or more components or devices. For example, storage 1009 may be a hard drive, a flash memory, a rewritable optical disk, a rewritable magnetic tape, or some combination of the above. The media used by storage 1009 also may be removable. For example, a removable hard drive may be used for storage 1009. The processor 1001 may access the memory 1002 via the communications bus 1010, which may operate as a database interface if the database is implemented locally within memory 1002.

Network adapters 1005, in these examples, provide for communications with other data processing systems or devices and may operate as a database interface if the database is network based. Network adapters 1005 may provide communications through the use of either or both physical and wireless communications links.

Input/output controller 1006 allows for input and output of data with other devices that may be connected to computing architecture system 1000. For example, input/output controller 1006 may provide a connection for user input through a keyboard, a mouse, and/or some other suitable input device. Further, input/output controller 1006 may send output to a printer. Output device 1008 could be a display or virtual reality system which provides a mechanism to display information to a user.

Instructions for the operating system, applications and/or programs may be located in storage 1009, which are in communication with processor 1001 through a communications fabric similar to communication bus 1010. In these illustrative examples, the instructions are in a functional form on storage 1009. These instructions may be loaded into memory 1002 for execution by the processor 1001. The processes of the different embodiments may be performed by processor 1001 using computer-implemented instructions, which may be located in a memory, such as memory 1004. These instructions are referred to as program code, computer usable program code, or computer readable program code that may be read and executed by a processor in processor unit 1001. The program code in the different embodiments may be embodied on different physical or tangible computer readable media, such as memory 1002 or storage 1009.

In some illustrative embodiments, computer programs 1004 may be downloaded over a network for use within data processing system 1000. For instance, computer programs stored in a computer readable storage medium in a server data processing system (not shown) may be downloaded over a network (not shown) from the server to computer architecture system 1000. The computer programs 1004 may be loaded from a server computer, a client computer, or some other device capable of storing and transmitting computer programs 1004.

The different components illustrated for data processing system 1000 are not meant to provide architectural limitations to the manner in which different embodiments may be implemented and should not limit the scope of the present invention. The different illustrative embodiments may be implemented in a computer architecture system including components in addition to or in place of those illustrated in FIG. 10. Other components shown in FIG. 10 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor. As another example, a storage device in data processing system 1000 may be any hardware apparatus that may store data. Memory elements 1002 and storage 1009 are examples of storage devices in a tangible form.

Although various embodiments of the present invention have been described and illustrated, it will be apparent to those skilled in the art that numerous modifications and variations can be made without departing from the scope of the invention, which is defined in the appended claims.

What is claimed is:

1. A method comprising:
    receiving a natural language request for a database query from a user;
    identifying a plurality of words in the natural language request including at least one queried element, the queried element associated with an intent by the user for the database query;
    determining at least one alternative element for the queried element, the alternative element associated with a possible alternative intent for the database query not included in the natural language request; and
    presenting a visual representation of the natural language request to the user, the visual representation comprising a set of the words identified in the natural language request and a user selectable interface enabling the user to select the queried element or the alternative element to include in the database query.

2. The method according to claim 1 further comprising:
    causing a first database query to a database using elements from the natural language request including the queried element;
    receiving results from the database in response to the first database query; and
    presenting the results of the first database query to the user concurrently with presenting the visual representation of the natural language request including the user selectable interface to the user.

3. The method according to claim 2 further comprising:
    receiving a selection of the alternative element from the user selectable interface;
    causing a second database query to the database using elements from the natural language query with the selected alternative element instead of the queried element;
    receiving results from the database in response to the second database query; and
    presenting the results of the second database query to the user.

4. The method according to claim 3 further comprising presenting the visual representation of the natural language query with the selected alternative element replacing the queried element.

5. The method according to claim 1, wherein the user selectable interface comprises a selectable element within the visual representation of the natural language query; and wherein, if the user selects the selectable element, the method comprises presenting a menu with the queried element and the alternative element selectable by the user.

6. The method according to claim 5, wherein the selectable element is a visual representation of the queried element.

7. The method according to claim 1, wherein the determining at least one alternative element for the queried element comprises determining a plurality of alternative elements for the queried element, each of the plurality of alternative elements being associated with a different possible alternative intent for the database query not included in the natural language request.

8. The method according to claim 3, wherein the database comprises a plurality of records, each record comprising an entry for each of a plurality of attributes of the records;

wherein the queried element comprises one of the attributes of the records as a queried attribute and the alternative element comprises another one of the attributes of the records as an alternative attribute; and wherein the results from the first database query comprises a subset of the plurality of records at least partially determined based upon the queried attribute and the results from the second database query comprises a subset of the plurality of records at least partially determined based upon the alternative attribute.

9. The method according to claim 3, wherein the database comprises a plurality of records sortable by a plurality of metadata components, each of the records comprising a value for each of the metadata components; wherein the queried element comprises one of the metadata components and the alternative element comprises another one of the metadata components; and wherein the results from the first query comprises a subset of the plurality of records determined based upon the metadata component of the queried element and the results from the second query comprises a subset of the plurality of records determined based upon the metadata component of the alternative element.

10. The method according to claim 1 further comprising identifying a subject in the natural language query associated with the queried element; wherein the queried element is a relative term associated with the subject; wherein the queried element relates to a first context of the subject and the alternative element relates to a second context of the subject.

11. The method according to claim 10, wherein the first context of the subject comprises one of an increase in value and a decrease in value of the subject and the second context of the subject comprises the other one of the increase in value and the decrease in value of the subject.

12. The method according to claim 1 further comprising:
identifying a queried relative term associated with the queried element in the natural language query, the queried relative term relating to a first context of the queried element; and
determining at least one alternative relative term to the queried relative term, the alternative relative term relating to a second context of the queried element;
wherein the user selectable interface comprises a first user selectable interface and the visual representation of the natural language query comprises a second user selectable interface enabling the user to select the queried relative term or the alternative relative term to include in the natural language query.

13. The method according to claim 12, wherein the first context of the queried element comprises one of an increase in value and a decrease in value of the queried element and the second context of the queried element comprises the other one of the increase in value and the decrease in value of the queried element.

14. The method according to claim 1, wherein the identifying at least one queried element comprises identifying first and second queried elements in the natural language query; and wherein the determining at least one alternative element to the queried element comprises determining at least one first alternative element to the first queried element and determining at least one second alternative element to the second queried element, the first alternative element being categorized with the first queried element and the second alternative element being categorized with the second queried element; and wherein the user selectable interface comprises a first user selectable interface enabling the user to select one of the first queried element and the first alternative element to include in the natural language query and the visual representation of the natural language query comprises a second user selectable interface enabling the user to select one of the second queried element and the second alternative element to include in the natural language query.

15. The method according to claim 1, wherein the receiving a natural language query from a user comprises receiving a verbal query from the user and the method further comprises interpreting the verbal query to determine a textual representation of the verbal query; wherein the identifying at least one queried element in the natural language query comprises identifying at least one queried element in the textual representation of the verbal query.

16. The method according to claim 1, wherein the receiving a natural language query from a user comprising receiving a textual query from the user; wherein the identifying at least one queried element in the natural language query comprises identifying at least one queried element in the textual query.

17. A computing system operable to be coupled to a user input device and a visual display, comprising:
a database interface; and
a processing apparatus coupled to the database interface, the processing apparatus operable to receive a natural language request for a database query from a user via the user input device; to identify a plurality of words in the natural language request including at least one queried element, the queried element associated with an intent by the user for the database query; to determine at least one alternative element for the queried element, the alternative element associated with a possible alternative intent for the database query not included in the natural language request; and to present a visual representation of the natural language request on the visual display, the visual representation comprising a set of the words identified in the natural language request and a user selectable interface enabling the user to select the queried element or the alternative element to include in the database query.

18. The computing system according to claim 17, wherein the processing apparatus is further operable to cause a first database query to a database via the database interface using elements from the natural language request including the queried element; to receive results from the database via the database interface in response to the first database query; and to present the results of the first database query on the visual display concurrently with presenting the visual representation of the natural language request including the user selectable interface on the visual display.

19. The computing system according to claim 18, wherein the processing apparatus is further operable to receive a selection of the alternative element from the user selectable interface; to cause a second database query to the database via the database interface using elements from the natural language query with the selected alternative element instead of the queried element; to receive results from the database via the network interface in response to the second database query; to present the results of the second database query on the visual display; and to present the visual representation of the natural language query with the selected alternative element replacing the queried element on the visual display.

20. Non-transitory computer-readable media containing a program element executable by a computing system to perform a method for presenting a visual representation of a natural language query, the computer-readable media comprising:

first program code for receiving a natural language request for a database query from a user;
second program code for identifying a plurality of words in the natural language request including at least one queried element, the queried element associated with an intent by the user for the database query;
third program code for determining at least one alternative element for the queried element, the alternative element associated with a possible alternative intent for the database query not included in the natural language request; and
fourth program code for presenting a visual representation of the natural language request to the user, the visual representation comprising a set of the words identified in the natural language request and a user selectable interface enabling the user to select the queried element or the alternative element to include in the database query.

* * * * *